(12) United States Patent
Nishio et al.

(10) Patent No.: US 12,548,477 B2
(45) Date of Patent: *Feb. 10, 2026

(54) POLARIZATION PLATE FOR FOLDING DISPLAY

(71) Applicant: TOYOBO CO., LTD., Osaka (JP)

(72) Inventors: Shotaro Nishio, Tsuruga (JP); Kiwamu Kawai, Tsuruga (JP); Akira Shimizu, Tsuruga (JP)

(73) Assignee: TOYOBO CO., LTD., Osaka (JP)

(*) Notice: Subject to any disclaimer, the term of this patent is extended or adjusted under 35 U.S.C. 154(b) by 773 days.

This patent is subject to a terminal disclaimer.

(21) Appl. No.: 17/615,426

(22) PCT Filed: May 15, 2020

(86) PCT No.: PCT/JP2020/019484
§ 371 (c)(1),
(2) Date: Nov. 30, 2021

(87) PCT Pub. No.: WO2020/241312
PCT Pub. Date: Dec. 3, 2020

(65) Prior Publication Data
US 2022/0236467 A1 Jul. 28, 2022

(30) Foreign Application Priority Data

May 30, 2019 (JP) ................................ 2019-101024

(51) Int. Cl.
*G09F 9/30* (2006.01)
*B32B 27/36* (2006.01)
(Continued)

(52) U.S. Cl.
CPC .............. *G09F 9/301* (2013.01); *B32B 27/36* (2013.01); *G02B 5/3016* (2013.01); *G02B 5/305* (2013.01);
(Continued)

(58) Field of Classification Search
CPC ...... G02B 1/14; G02B 5/3016; G02B 5/3083; G02B 1/04
See application file for complete search history.

(56) References Cited

U.S. PATENT DOCUMENTS 4,115,617 A * 9/1978 Mitsuishi .................. C09J 7/255
428/458
4,561,724 A  12/1985 Otaki et al.
(Continued)

FOREIGN PATENT DOCUMENTS

CN  1760703 A  4/2006
CN  1839176 A  9/2006
(Continued)

OTHER PUBLICATIONS

Park, Jae Sung, et al. "Investigating the mechanical and optical properties of thin PDMS film by flat-punched indentation." Optical Materials 85 (2018): 153-161. (Year: 2018).*

(Continued)

*Primary Examiner* — Christopher Stanford
(74) *Attorney, Agent, or Firm* — Leydig, Voit & Mayer, Ltd.

(57) ABSTRACT

The present invention provides a polarizing plate for a foldable display free of a risk of causing distortion in an image displayed at a folding portion thereof after being repeatedly folded. The polarizing plate for a foldable display includes: a polarizer; and a polarizer protective film formed of a polyester film laminated on at least one surface of the polarizer, wherein the polyester film satisfies the following conditions: (1) a refractive index in a bending direction is from 1.590 to 1.620; (2) a refractive index in a folding portion direction is from 1.670 to 1.700; (3) a refractive index in a thickness direction is 1.520 or less; and (4) a density is 1.380 g/cm³ or more, wherein the bending direc- (Continued)

tion refers to a direction orthogonal to a folding portion of the polyester film at a time when the polyester film is folded.

17 Claims, 1 Drawing Sheet

(51) Int. Cl.
  *G02B 5/30*  (2006.01)
  *H10K 59/80*  (2023.01)
(52) U.S. Cl.
  CPC ........ *G02B 5/3083* (2013.01); *H10K 59/8791* (2023.02); *H10K 59/8793* (2023.02); *H10K 59/879* (2023.02)

(56) References Cited

U.S. PATENT DOCUMENTS

| | | | |
|---|---|---|---|
| 5,429,855 A | 7/1995 | Kotani et al. | |
| 5,833,880 A | 11/1998 | Siemensmeyer et al. | |
| 10,070,516 B1 | 9/2018 | Shih et al. | |
| 11,899,167 B2 | 2/2024 | Nishio et al. | |
| 11,934,226 B2 | 3/2024 | Nishio et al. | |
| 11,939,499 B2 | 3/2024 | Nishio et al. | |
| 11,997,916 B2 | 5/2024 | Nishio et al. | |
| 2002/0034709 A1 | 3/2002 | Fukuda et al. | |
| 2002/0036285 A1 | 3/2002 | Prechtl et al. | |
| 2002/0146518 A1 | 10/2002 | Kusume et al. | |
| 2002/0167111 A1 | 11/2002 | Tsunekawa et al. | |
| 2003/0072893 A1 | 4/2003 | Nakano et al. | |
| 2004/0028925 A1 | 2/2004 | Kusume et al. | |
| 2004/0037978 A1 | 2/2004 | Tsubaki et al. | |
| 2004/0075080 A1 | 4/2004 | Prechtl et al. | |
| 2004/0212767 A1 | 10/2004 | Sasaki et al. | |
| 2005/0099562 A1 | 5/2005 | Nishikouji et al. | |
| 2006/0077320 A1 | 4/2006 | Hata et al. | |
| 2006/0210709 A1 | 9/2006 | Shutou | |
| 2006/0227439 A1 | 10/2006 | Taki et al. | |
| 2008/0193747 A1 | 8/2008 | MacDonald et al. | |
| 2008/0233312 A1 | 9/2008 | Nakamura et al. | |
| 2009/0068472 A1 | 3/2009 | Umemoto et al. | |
| 2009/0137761 A1 | 5/2009 | Irisawa et al. | |
| 2009/0247782 A1 | 10/2009 | Irisawa et al. | |
| 2009/0269513 A1 | 10/2009 | Nishiyama et al. | |
| 2009/0275742 A1 | 11/2009 | Sano et al. | |
| 2011/0315306 A1 | 12/2011 | Goto et al. | |
| 2012/0037928 A1 | 2/2012 | Shim et al. | |
| 2012/0052197 A1 | 3/2012 | Sawada et al. | |
| 2012/0055607 A1 | 3/2012 | Kitagawa et al. | |
| 2012/0055608 A1 | 3/2012 | Kitagawa et al. | |
| 2012/0055621 A1 | 3/2012 | Goto et al. | |
| 2012/0055622 A1 | 3/2012 | Kitagawa et al. | |
| 2012/0055623 A1 | 3/2012 | Kitagawa et al. | |
| 2012/0056211 A1 | 3/2012 | Kitagawa et al. | |
| 2012/0056340 A1 | 3/2012 | Kitagawa et al. | |
| 2012/0057104 A1 | 3/2012 | Kitagawa et al. | |
| 2012/0057107 A1 | 3/2012 | Kitagawa et al. | |
| 2012/0057231 A1 | 3/2012 | Goto et al. | |
| 2012/0057232 A1 | 3/2012 | Goto et al. | |
| 2012/0058291 A1 | 3/2012 | Kitagawa et al. | |
| 2012/0058321 A1 | 3/2012 | Goto et al. | |
| 2012/0107605 A1 | 5/2012 | Ozawa et al. | |
| 2012/0229732 A1 | 9/2012 | Koike et al. | |
| 2012/0327512 A1 | 12/2012 | Goto et al. | |
| 2013/0088859 A1 | 4/2013 | Wang | |
| 2013/0100529 A1 | 4/2013 | Kitagawa et al. | |
| 2013/0114139 A1 | 5/2013 | Kitagawa et al. | |
| 2014/0016198 A1 | 1/2014 | Sawada et al. | |
| 2014/0044947 A1 | 2/2014 | Sawada et al. | |
| 2014/0104519 A1 | 4/2014 | Murata et al. | |
| 2014/0186568 A1 | 7/2014 | Kitagawa et al. | |
| 2015/0183199 A1 | 7/2015 | Kitagawa et al. | |
| 2015/0369981 A1 | 12/2015 | Takeda et al. | |
| 2016/0025910 A1 | 1/2016 | Sawada et al. | |
| 2016/0035801 A1 | 2/2016 | Kim | |
| 2016/0054494 A1 | 2/2016 | Kitagawa et al. | |
| 2016/0062012 A1 | 3/2016 | Shin et al. | |
| 2016/0103249 A1 | 4/2016 | Sato et al. | |
| 2016/0103258 A1 | 4/2016 | Kitagawa et al. | |
| 2016/0318845 A1 | 11/2016 | Katoh et al. | |
| 2017/0131445 A1 | 5/2017 | Koyama | |
| 2017/0276840 A1 | 9/2017 | Horio et al. | |
| 2018/0088392 A1 | 3/2018 | Park et al. | |
| 2018/0095211 A1 | 4/2018 | Lee et al. | |
| 2018/0179395 A1 | 6/2018 | Seo et al. | |
| 2018/0217639 A1 | 8/2018 | Jones et al. | |
| 2018/0356564 A1 | 12/2018 | Jeong et al. | |
| 2018/0368255 A1 | 12/2018 | Shih et al. | |
| 2019/0004367 A1 | 1/2019 | Koike et al. | |
| 2019/0177577 A1 | 6/2019 | Yamasaki et al. | |
| 2019/0219740 A1 | 7/2019 | Horio et al. | |
| 2019/0255807 A1 | 8/2019 | Isojima et al. | |
| 2020/0142116 A1 | 5/2020 | Lee et al. | |
| 2020/0269559 A1 | 8/2020 | Inagaki et al. | |
| 2020/0292739 A1* | 9/2020 | Tomohisa | H10K 77/111 |
| 2020/0353734 A1 | 11/2020 | Kim et al. | |
| 2021/0041603 A1 | 2/2021 | Kanke et al. | |
| 2021/0132663 A1 | 5/2021 | Hongo et al. | |
| 2021/0179794 A1 | 6/2021 | Yoshino et al. | |
| 2021/0179901 A1 | 6/2021 | Fujita et al. | |
| 2022/0085307 A1 | 3/2022 | Nishio et al. | |
| 2022/0164003 A1 | 5/2022 | Nishio et al. | |
| 2022/0213350 A1 | 7/2022 | Nishio et al. | |
| 2022/0214486 A1 | 7/2022 | Isojima et al. | |
| 2022/0227950 A1 | 7/2022 | Nishio et al. | |
| 2022/0236467 A1 | 7/2022 | Nishio et al. | |
| 2022/0236468 A1 | 7/2022 | Nishio et al. | |
| 2022/0246069 A1 | 8/2022 | Nishio et al. | |
| 2022/0252763 A1 | 8/2022 | Nishio et al. | |
| 2022/0275159 A1 | 9/2022 | Yamaguchi et al. | |
| 2022/0389269 A1 | 12/2022 | Yamaguchi et al. | |
| 2023/0122628 A1 | 4/2023 | Matsumura et al. | |
| 2023/0192974 A1 | 6/2023 | Nishio et al. | |

FOREIGN PATENT DOCUMENTS

| | | |
|---|---|---|
| CN | 1967294 A | 5/2007 |
| CN | 101160674 A | 4/2008 |
| CN | 101923245 A | 12/2010 |
| CN | 104067352 A | 9/2014 |
| CN | 104159735 A | 11/2014 |
| CN | 105321978 A | 2/2016 |
| CN | 106488839 A | 3/2017 |
| CN | 107867030 A | 4/2018 |
| CN | 108349228 A | 7/2018 |
| CN | 109789691 A | 5/2019 |
| EP | 112488 A1 | 7/1984 |
| EP | 3922668 A1 | 12/2021 |
| EP | 3923263 A1 | 12/2021 |
| EP | 3978554 A1 | 4/2022 |
| EP | 3978966 A1 | 4/2022 |
| EP | 4119599 A1 | 1/2023 |
| JP | S60-097323 A | 5/1985 |
| JP | S60-203422 A | 10/1985 |
| JP | S61-009619 A | 1/1986 |
| JP | S63-001357 B2 | 1/1988 |
| JP | S63-301850 A | 12/1988 |
| JP | H05-049710 B2 | 7/1993 |
| JP | H10-316783 A | 12/1998 |
| JP | H11-513360 A | 11/1999 |
| JP | 2000-063538 A | 2/2000 |
| JP | 2000-177001 A | 6/2000 |
| JP | 2001-324603 A | 11/2001 |
| JP | 2001-350021 A | 12/2001 |
| JP | 2002-030042 A | 1/2002 |
| JP | 2002-178400 A | 6/2002 |
| JP | 2002-229039 A | 8/2002 |
| JP | 2002-265541 A | 9/2002 |
| JP | 2002-303722 A | 10/2002 |
| JP | 2002-308832 A | 10/2002 |
| JP | 2002-317013 A | 10/2002 |
| JP | 2003-089151 A | 3/2003 |
| JP | 2003-520878 A | 7/2003 |
| JP | 2004-204190 A | 7/2004 |

(56) References Cited

FOREIGN PATENT DOCUMENTS

| | | |
|---|---|---|
| JP | 2004-529220 A | 9/2004 |
| JP | 2004-299101 A | 10/2004 |
| JP | 2005-154566 A | 6/2005 |
| JP | 2005-263789 A | 9/2005 |
| JP | 2005-331909 A | 12/2005 |
| JP | 2006-187880 A | 7/2006 |
| JP | 2006-285197 A | 10/2006 |
| JP | 2007-016207 A | 1/2007 |
| JP | 2007-076839 A | 3/2007 |
| JP | 2007-094071 A | 4/2007 |
| JP | 2007-510946 A | 4/2007 |
| JP | 2007-119415 A | 5/2007 |
| JP | 2007-121721 A | 5/2007 |
| JP | 2007-126628 A | 5/2007 |
| JP | 2007-133184 A | 5/2007 |
| JP | 2007-138138 A | 6/2007 |
| JP | 2007-140465 A | 6/2007 |
| JP | 2007-156439 A | 6/2007 |
| JP | 2007-186430 A | 7/2007 |
| JP | 2008-070708 A | 3/2008 |
| JP | 2008-149577 A | 7/2008 |
| JP | 2008-242231 A | 10/2008 |
| JP | 2009-093074 A | 4/2009 |
| JP | 2009-109831 A | 5/2009 |
| JP | 2009-149066 A | 7/2009 |
| JP | 2009-199087 A | 9/2009 |
| JP | 2010-168570 A | 8/2010 |
| JP | 2010-228391 A | 10/2010 |
| JP | 2011-002816 A | 1/2011 |
| JP | 2011-154134 A | 8/2011 |
| JP | 2012-073563 A | 4/2012 |
| JP | 2012-107080 A | 6/2012 |
| JP | 2012-214726 A | 11/2012 |
| JP | 2013-033248 A | 2/2013 |
| JP | 2013-052561 A | 3/2013 |
| JP | 2013-101328 A | 5/2013 |
| JP | 2013-114131 A | 6/2013 |
| JP | 2013-184431 A | 9/2013 |
| JP | 2013-210624 A | 10/2013 |
| JP | 2014-065887 A | 4/2014 |
| JP | 2014-186210 A | 10/2014 |
| JP | 2014-206682 A | 10/2014 |
| JP | 2014-221560 A | 11/2014 |
| JP | 2015-007702 A | 1/2015 |
| JP | 2015-030157 A | 2/2015 |
| JP | 2015-064418 A | 4/2015 |
| JP | 2015-129210 A | 7/2015 |
| JP | 2015-163596 A | 9/2015 |
| JP | 2015-174357 A | 10/2015 |
| JP | 2015-184664 A | 10/2015 |
| JP | 2015-232120 A | 12/2015 |
| JP | 2016-004055 A | 1/2016 |
| JP | 2016-075869 A | 5/2016 |
| JP | 2016-090925 A | 5/2016 |
| JP | 2016-155124 A | 9/2016 |
| JP | 2017-033033 A | 2/2017 |
| JP | 2017-033034 A | 2/2017 |
| JP | 2017-067819 A | 4/2017 |
| JP | 2017-134416 A | 8/2017 |
| JP | 2018-010086 A | 1/2018 |
| JP | 2018-022060 A | 2/2018 |
| JP | 2018-027995 A | 2/2018 |
| JP | 2018-059070 A | 4/2018 |
| JP | 6307205 B1 | 4/2018 |
| JP | 2018-072663 A | 5/2018 |
| JP | 2018-124367 A | 8/2018 |
| JP | 2018-202696 A | 12/2018 |
| JP | 2018-538572 A | 12/2018 |
| JP | 2019-008026 A | 1/2019 |
| JP | 2019-082648 A | 5/2019 |
| KR | 10-2000-0023039 A | 4/2000 |
| KR | 10-2002-0029377 A | 4/2002 |
| KR | 10-1713277 B1 | 3/2017 |
| TW | 201733807 A | 10/2017 |
| TW | 201839476 A | 11/2018 |
| WO | WO 2001/053384 A1 | 7/2001 |
| WO | WO 2002/062873 A1 | 8/2002 |
| WO | WO 2005/045485 A1 | 5/2005 |
| WO | WO 2006/100830 A1 | 9/2006 |
| WO | WO 2010/100917 A1 | 9/2010 |
| WO | WO 2011/058774 A1 | 5/2011 |
| WO | WO 2012/121042 A1 | 9/2012 |
| WO | WO 2013/100042 A1 | 7/2013 |
| WO | WO 2014/203894 A1 | 12/2014 |
| WO | WO 2016/010134 A1 | 1/2016 |
| WO | WO 2017/115736 A1 | 7/2017 |
| WO | WO 2017/200042 A1 | 11/2017 |
| WO | WO 2018/003963 A1 | 1/2018 |
| WO | WO 2018/070132 A1 | 4/2018 |
| WO | WO 2018/150940 A1 | 8/2018 |
| WO | WO 2018/159285 A1 | 9/2018 |
| WO | WO 2019/026753 A1 | 2/2019 |
| WO | WO 2019/202992 A1 | 10/2019 |
| WO | WO 2019/216172 A1 | 11/2019 |
| WO | WO 2020/162119 A1 | 8/2020 |
| WO | WO 2020/162120 A1 | 8/2020 |
| WO | WO 2020/241278 A1 | 12/2020 |
| WO | WO 2020/241279 A1 | 12/2020 |
| WO | WO 2020/241280 A1 | 12/2020 |
| WO | WO 2020/241281 A1 | 12/2020 |
| WO | WO 2020/241313 A1 | 12/2020 |
| WO | WO 2021/010158 A1 | 1/2021 |
| WO | WO 2021/010159 A1 | 1/2021 |

OTHER PUBLICATIONS

Yang, "Review of Operating Principle and Performance of Polarizer-Free Reflective Liquid-Crystal Displays," *Journal of the Society for Information Display*, 16(1): 117-124 (2012).
Wikipedia, "Cyclic Olefin Copolymer" (2023) [accessed at https://en.wikipedia.org/wiki/Cyclic_olefin_copolymer].
European Patent Office, Extended European Search Report in European Patent Application No. 20814476.6 (Jun. 12, 2023).
European Patent Office, Extended European Search Report in European Patent Application No. 20815401.3 (Jun. 12, 2023).
Japanese Patent Office, International Search Report in International Patent Application No. PCT/JP2020/019264 (Jul. 21, 2020).
Japanese Patent Office, International Search Report in International Patent Application No. PCT/JP2020/019265 (Jul. 21, 2020).
Japanese Patent Office, International Search Report in International Patent Application No. PCT/JP2020/019266 (Jul. 28, 2020).
Japanese Patent Office, International Search Report in International Patent Application No. PCT/JP2020/019267 (Jul. 21, 2020).
European Patent Office, Extended European Search Report in European Application No. 20815504.4 (May 15, 2023).
Japan Patent Office, Office Action in Japanese Patent Application No. 2020-086715 (Oct. 17, 2023).
European Patent Office, Extended European Search Report in European Patent Application No. 20752680.7 (Oct. 26, 2022).
European Patent Office, Extended European Search Report in European Patent Application No. 20753154.2 (Oct. 10, 2022).
European Patent Office, Extended European Search Report in European Application No. 20815576.2 (May 9, 2023).
Japanese Patent Office, International Search Report in International Patent Application No. PCT/JP2020/001043 (Mar. 24, 2020).
Japanese Patent Office, International Search Report in International Patent Application No. PCT/JP2020/001044 (Mar. 17, 2020).
Lub et al., "The synthesis of liquid-crystalline diacrylates derived from cyclohexane units," *Recl. Trav. Chim. Pays-Bas*, 115(6): 321-328 (1996).
Japanese Patent Office, International Search Report in International Patent Application No. PCT/JP2020/019484 (Jul. 28, 2020).
Japanese Patent Office, International Search Report in International Patent Application No. PCT/JP2020/019485 (Jul. 14, 2020).
Korean Intellectual Property Office, Office Action in Korean Patent Application No. 10-2022-7003303 (Sep. 20, 2024).
Korean Intellectual Property Office, Office Action in Korean Patent Application No. 10-2022-7003304 (Sep. 25, 2024).
U.S. Appl. No. 17/429,119, filed Aug. 6, 2021.

(56) References Cited

OTHER PUBLICATIONS

U.S. Appl. No. 17/429,147, filed Aug. 6, 2021.
U.S. Appl. No. 17/614,154, filed Nov. 24, 2021.
U.S. Appl. No. 17/614,201, filed Nov. 24, 2021.
U.S. Appl. No. 17/614,228, filed Nov. 24, 2021.
U.S. Appl. No. 17/614,260, filed Nov. 24, 2021.
U.S. Appl. No. 17/615,433, filed Nov. 30, 2021.
U.S. Appl. No. 17/625,291, filed Jan. 6, 2022.
U.S. Appl. No. 17/625,302, filed Jan. 6, 2022.
U.S. Appl. No. 18/643,154, filed Apr. 23, 2024.
Japanese Patent Office, International Search Report in International Patent Application No. PCT/JP2020/025671 (Sep. 15, 2020).
Japanese Patent Office, International Search Report in International Patent Application No. PCT/JP2020/025672 (Sep. 15, 2020).
European Patent Office, Extended European Search Report in European Patent Application No. 20840513.4 (Jul. 3, 2023).
European Patent Office, Extended European Search Report in European Patent Application No. 20840729.6 (Jul. 3, 2023).
Korean Intelelctual Property Office, Office Action in Korean Patent Application No. 10-2021-7041987 (Mar. 18, 2025).

* cited by examiner

POLARIZATION PLATE FOR FOLDING DISPLAY

TECHNICAL FIELD

The present invention relates to a polarizing plate for a foldable display, a circularly polarizing plate for a foldable display, a method of producing a circularly polarizing plate for a foldable display, and a foldable display.

BACKGROUND ART

Becoming thinner and lighter, a mobile device, such as a smartphone, has become widely prevalent. While being required to have a variety of functions, the mobile device is also required to be convenient in use. It is taken for granted that a prevailing mobile device can be operated with one hand for simple tasks, and can be put into a clothes pocket. Thus, such mobile device needs to have a small screen size, such as about 6 inches.

Meanwhile, a tablet device having a screen size of from 7 inches to 10 inches is intended for use not only for video content and music, but also for business and drawing purposes, reading, and the like, and thus has a high level of functionality. However, the tablet device cannot be operated with one hand and is not particularly portable, leaving some issues in regard to convenience.

In order to meet the requirements described above, there is a proposal of a technique involving making a compact device by connecting a plurality of displays (see PTL 1). However, due to the remaining bezel portion, the image is cut up, and the visibility becomes low. Thus, this technique is not commonly used.

In recent years, a mobile device including a flexible display or a foldable display has been proposed. This technique enables one to conveniently carry a mobile device including a large-screen display without image-cutting problems.

In a liquid crystal display, linearly polarizing plates are arranged on both sides of a liquid crystal cell. In an EL display or the like, a circularly polarizing plate is arranged on a viewing side of a cell in order to prevent reflection. When a display is made to form a single plane across a folding portion thereof, a polarizing plate having flexibility and also having a sufficient degree of polarization needs to be used. However, for example, there has been a problem in that the foldable display is repeatedly folded at a certain point that is a folding portion, and hence the polarizing plate at the point deforms over time, causing image distortion on the display.

CITATION LIST

Patent Literature

PTL 1: JP 2010-228391 A

SUMMARY OF INVENTION

Technical Problem

The present invention is intended to provide a polarizing plate and circularly polarizing plate for a foldable display free of a risk of causing distortion in an image displayed at a folding portion thereof after being repeatedly folded, a method of producing a circularly polarizing plate, and a foldable display.

Solution to Problem

Specifically, the present invention includes the following configurations.

Item 1

A polarizing plate for a foldable display, including:
a polarizer; and
a polarizer protective film formed of a polyester film laminated on at least one surface of the polarizer,
wherein the polyester film satisfies the following conditions:
(1) a refractive index in a bending direction is from 1.590 to 1.620;
(2) a refractive index in a folding portion direction is from 1.670 to 1.700;
(3) a refractive index in a thickness direction is 1.520 or less; and
(4) a density is 1.380 g/cm$^3$ or more,
wherein the bending direction refers to a direction orthogonal to a folding portion of the polyester film at a time when the polyester film is folded.

Item 2

A circularly polarizing plate for a foldable display, including: the polarizing plate for a foldable display of Item 1; and a retardation layer formed on at least one surface of the polarizing plate.

Item 3

The circularly polarizing plate for a foldable display according to Item 2, wherein the circularly polarizing plate is free of any self-supporting film or further includes only one self-supporting film other than the polyester film.

Item 4

The polarizing plate for a foldable display according to Item 1, wherein the polarizer has a thickness of 12 μm or less.

Item 5

The circularly polarizing plate for a foldable display according to Item 2 or 3, wherein the polarizer has a thickness of 12 μm or less.

Item 6

The polarizing plate for a foldable display according to Item 1 or 4, wherein the polarizer is formed of a polymerizable liquid crystal compound and a dichroic dye.

Item 7

The circularly polarizing plate for a foldable display according to Item 2, 3, or 5, wherein the polarizer is formed of a polymerizable liquid crystal compound and a dichroic dye.

Item 8

A foldable display including the polarizing plate for a foldable display of Item 1, 4, or 6.

Item 9

A foldable display including the circularly polarizing plate for a foldable display of Item 2, 3, 5, or 7, wherein the retardation layer contains a liquid crystal compound.

Item 10

A method of producing a circularly polarizing plate for a foldable display, including the following steps:
(A) a step of preparing a polyester film having the following characteristics:
(1) a refractive index in a bending direction is from 1.590 to 1.620;
(2) a refractive index in a folding portion direction is from 1.670 to 1.700;
(3) a refractive index in a thickness direction is 1.520 or less; and
(4) a density is 1.380 g/cm$^3$ or more, wherein the bending direction refers to a direction orthogonal to a folding portion of the polyester film at a time when the polyester film is folded;

(B) a step of arranging a polarizer on the polyester film by any one of the following method (a) or (b):

(a) a method involving transferring a polarizer arranged on a releasable support substrate onto a substrate film; or (b) a method involving applying a composition for a polarizing film, which is formed of a polymerizable liquid crystal compound and a dichroic dye, to a substrate film, and orienting the applied film to form the polarizer; and (C) a step of laminating a retardation layer on the polarizer.

Item 11

A method of producing a circularly polarizing plate for a foldable display, including the following steps:

(A) a step of preparing a polyester film having the following characteristics:

(1) a refractive index in a bending direction is from 1.590 to 1.620;

(2) a refractive index in a folding portion direction is from 1.670 to 1.700;

(3) a refractive index in a thickness direction is 1.520 or less; and (4) a density is 1.380 g/cm$^3$ or more, wherein the bending direction refers to a direction orthogonal to a folding portion of the polyester film at a time when the polyester film is folded;

(B) a step of laminating a polarizer on the polyester film; and (C) a step of arranging a retardation layer on the polarizer by any one of the following method (c) or (d):

(c) a method involving transferring a retardation layer arranged on a releasable support substrate onto the polarizer; or (d) a method involving applying a composition for a retardation layer, which is formed of a liquid crystal compound, onto the polarizer, and orienting the applied film to form the retardation layer.

Item 12

The method of producing a circularly polarizing plate for a foldable display according to Item 10, wherein (C) the step of laminating a retardation layer on the polarizer includes any one of:

(c) a method involving transferring a retardation layer arranged on a releasable support substrate onto the polarizer; or (d) a method involving applying a composition for a retardation layer, which is formed of a liquid crystal compound, to the polarizer, and orienting the applied film to form the retardation layer.

Advantageous Effects of Invention

Each of the polarizing plate and the circularly polarizing plate of the present invention hardly has a fold mark even when repeatedly folded, is free of a risk of causing image distortion at the folding portion thereof, and hence can be suitably used for a foldable display. In addition, the foldable display of the present invention can display an image free of distortion at the folding portion thereof.

DESCRIPTION OF EMBODIMENTS (Display)

Figure 1:
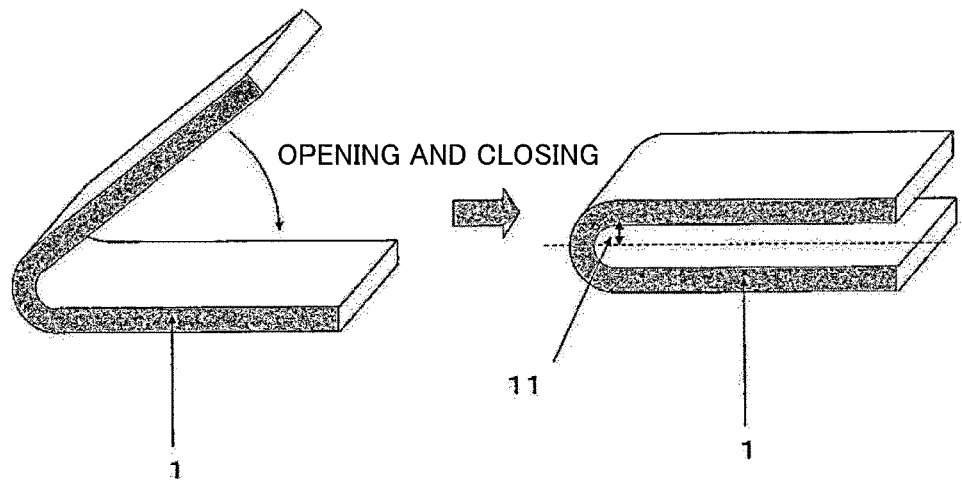
FIG. 1 is a schematic view for illustrating a bend radius at a time when a foldable display in the present invention is folded.

The term "display" as used in the present invention refers to display devices in general. There are several kinds of displays such as an LCD, an organic EL display, an inorganic EL display, an LED, and an FED. Of those, an LCD, an organic EL display, and an inorganic EL display, each of which has a foldable structure, are preferred. In particular, an organic EL display and an inorganic EL display, each of which can reduce a layer structure, are more preferred, and an organic EL display, which has a wide color gamut, is even more preferred.

(Foldable Display)

A foldable display is one continuous display that can be folded, for example, in half when carried. The foldable display can be reduced in size by half by being folded, to thereby improve portability. The bend radius of the foldable display is preferably 5 mm or less, more preferably 3 mm or less. When the bend radius is 5 mm or less, thinning in a folded state can be achieved. The bend radius may be said to be desirably as small as possible. However, as the bend radius becomes smaller, a fold mark becomes more liable to be formed. The bend radius is preferably 0.1 mm or more, but may be 0.5 mm or more, or may be 1 mm or more. Even when the bend radius is 1 mm, practically sufficient thinning can be achieved at the time of carrying. The bend radius of a device when folded is measured at a point marked with reference numeral 11 in the schematic view of FIG. 1, and means the inner radius of the folding portion of the device when folded. A surface protective film to be described later may be located on the outer side or the inner side of the folded foldable display.

In addition, the foldable display may be folded in thirds or fourths, or may be of a rolling type called rollable, and all of these fall within the range of the term "foldable display" as used in the present invention.

A. Polarizing Plate

In the foldable display, a polarizing plate is used. In a liquid crystal display, polarizing plates are arranged on both sides of a liquid crystal cell, and in an EL display or the like, a circularly polarizing plate for preventing the reflection of an internal structure is used in many cases.

The polarizing plate preferably has, as a typical configuration, a laminated configuration of a polarizer and a polarizer protective film for protecting the polarizer.

1. Polarizer Protective Film

First, the polarizer protective film of the polarizing plate is described. In the present invention, the polarizer protective film is preferably a film formed of polyester. When the polarizer protective film alone is described, the polarizer protective film is hereinafter sometimes referred to simply as "polyester film".

The polyester film may be a monolayered film formed of one or more kinds of polyester resins. When two or more kinds of polyester resins are used, the polyester film may be a multilayered film or an ultra-multilayered lamination film having a repeating structure.

Examples of the polyester resin to be used in the polyester film include polyethylene terephthalate, polybutylene terephthalate, polyethylene-2,6-naphthalate, and a polyester film formed of a copolymer containing the component of any such resin as a main component. Of those, a stretched polyethylene terephthalate film is particularly preferred from the viewpoints of, for example, mechanical properties, heat resistance, transparency, and price.

When the polyester copolymer is used in the polyester film, examples of the dicarboxylic acid component of the polyester include: aliphatic dicarboxylic acids, such as adipic acid and sebacic acid; aromatic dicarboxylic acids, such as terephthalic acid, isophthalic acid, phthalic acid, and 2,6-naphthalene dicarboxylic acid; and multifunctional carboxylic acids, such as trimellitic acid and pyromellitic acid. In addition, examples of the glycol component of the polyester include: aliphatic glycols, such as ethylene glycol, diethylene glycol, 1,4-butanediol, propylene glycol, and neopentyl glycol; aromatic glycols, such as p-xylene glycol; alicyclic glycols, such as 1,4-cyclohexanedimethanol; and polyethylene glycols each having an average molecular weight of from 150 to 20,000. The mass ratio of the copolymer component of the copolymer is preferably less than 20 mass %. A case in which the mass ratio is less than 20 mass % is preferred because film strength, transparency, and heat resistance are retained.

In addition, in the production of the polyester film, at least one kind of resin pellet preferably has a limiting viscosity of from 0.50 dl/g to 1.0 dl/g. A case in which the limiting viscosity is 0.50 dl/g or more is preferred because the impact resistance of a film to be obtained is improved, and hence breakage of a circuit in the display due to an external impact hardly occurs. Meanwhile, a case in which the limiting viscosity is 1.00 dl/g or less is preferred because film production can be easily operated in a stable manner without an excessively large increase in filtration pressure of molten fluid.

The polyester film preferably has a thickness of from 10 μm to 80 μm, more preferably from 25 μm to 75 μm. When the thickness is 10 μm or more, the film is excellent in handleability, and exhibits an impact resistance improvement effect. When the thickness is 80 μm or less, the film has an advantage in terms of weight reduction, and is excellent in flexibility, processability, handleability, and the like.

The haze of the polyester film is preferably 3% or less, more preferably 2% or less, most preferably 1% or less. When the haze is 3% or less, the visibility of an image can be improved. The lower limit of the haze is desirably as small as possible, but is preferably 0.1% or more from the viewpoint of stable production, and may be 0.3% or more.

From the purpose of reducing the haze as described above, the unevenness of the film surface is preferably not so large. However, to provide the film with moderate slipperiness for the viewpoint of handleability, unevenness may be formed on the film surface by blending particles into the polyester resin layer serving as the surface layer, or by coating the polyester resin layer with a particle-containing coating layer during a film formation process.

A known method may be adopted as a method of blending particles into the polyester resin layer. For example, the particles, which may be added in any stage of polyester production, may be preferably added in the form of a slurry prepared by dispersing the particles in, for example, ethylene glycol in the stage of esterification, in a stage after the completion of a transesterification reaction, or in a stage before the start of a polycondensation reaction to advance the polycondensation reaction. Alternatively, the particles may be added by, for example, a method of blending a slurry prepared by dispersing the particles in, for example, ethylene glycol or water with a polyester material by using a kneading extruder with a vent, or a method of blending dry particles with a polyester material by using a kneading extruder.

In particular, preferred is a method involving: homogeneously dispersing the aggregates of inorganic particles in a monomer solution, which is part of a polyester material; then filtering the dispersion; and adding the filtrate to the remainder of the polyester material before, during, or after an esterification reaction. This method, due to the low viscosity of the monomer solution, enables homogeneous dispersion of particles and high-precision filtration of the slurry in a simple manner, while ensuring excellent particle dispersibility and low likeliness of the occurrence of new aggregates when the particles are added to the remainder of the polyester material. From such viewpoints, it is particularly preferred to add the particles to the remainder of the polyester material in a low-temperature state before the esterification reaction.

In addition, the number of protrusions on the surface of the film may be further reduced by a method involving preparing a particle-containing polyester beforehand, and then subjecting pellets of the particle-containing polyester and particle-free pellets to kneading extrusion or the like (master batch method).

In addition, the polyester film may contain various additives within the range in which a preferred range of a total light transmittance is maintained. Examples of the additives include an antistatic agent, a UV absorber, and a stabilizer.

The polyester film has a total light transmittance of preferably 85% or more, more preferably 87% or more. When the transmittance is 85% or more, visibility can be sufficiently ensured. The total light transmittance of the polyester film may be said to be desirably as high as possible, but is preferably 99% or less from the viewpoint of stable production, and may be 97% or less.

The maximum heat shrinkage ratio of the polyester film after heat treatment at 150° C. for 30 minutes is preferably 6% or less, more preferably 5% or less. When the heat shrinkage ratio is 6% or less, a flat surface failure such as curling or waviness at the time of bonding processing can be suppressed. The heat shrinkage ratio may be said to be desirably as low as possible, but is preferably −1% or more, more preferably 0% or more. The minus in this case means expansion after heating, and a case in which the heat shrinkage ratio is −1% or more is preferred because there is no risk of the flat surface failure.

Next, a method of producing a biaxially-stretched polyester film is described in detail with an example in which pellets of polyethylene terephthalate (hereinafter sometimes referred to as "PET") are used as a material for a polyester film. However, the method is not limited to this example. In addition, the example is not intended to limit the number of layers such as a monolayer structure or a multilayer structure.

After a predetermined proportion of PET pellets are mixed and dried, the mixture is fed to a known extruder for melting and laminating, and extruded from a slit die into a sheet shape, followed by cooling and solidifying the sheet on a casting roll to form an unstretched film. A monolayer may be produced with a single extruder. A multilayered (i.e., including two or more layers) film may be produced by: laminating a plurality of film layers for forming an outermost layer using two or more extruders, a multilayered manifold, or a confluence block (e.g., a confluence block with a square joint); extruding a sheet of two or more layers from a mouthpiece; and cooling the sheet on a casting roll to form an unstretched film.

In this case, it is preferred to perform high-precision filtration to remove foreign matter contained in the resin at any portion of the extruder at which the molten resin is maintained at about 280° C. during melt-extrusion. A filtering medium to be used in the high-precision filtration of the molten resin is not particularly limited, but is preferably a filtering medium of a stainless-steel sintered body because of its excellent performance for removing an aggregate containing Si, Ti, Sb, Ge, or Cu as a main component and organic matter having a high melting point.

Further, the filtering medium has a filtered particle size (initial filtration efficiency: 95%) of preferably 20 µm or less, particularly preferably 15 µm or less. When the filtered particle size (initial filtration efficiency: 95%) of the filtering medium is more than 20 µm, foreign matter having a size of 20 µm or more cannot be sufficiently removed. Although high-precision filtration of a molten resin using a filtering medium having a filtered particle size (initial filtration efficiency: 95%) of 20 µm or less may reduce productivity, such filtering medium is preferred from the viewpoint of obtaining a film having fewer protrusions caused by coarse particles.

(With Regard to Refractive Index in Bending Direction)

Figure 2:
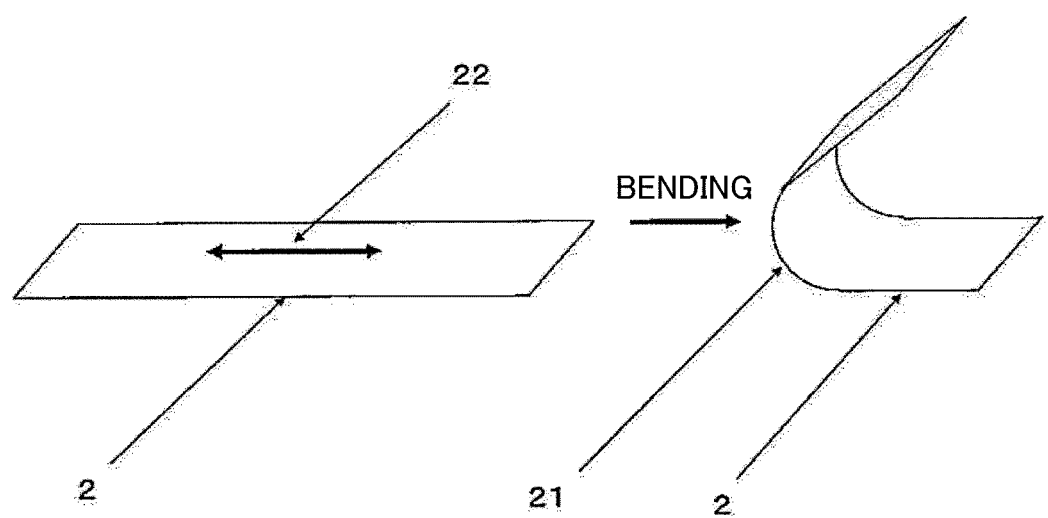
FIG. 2 is a schematic view for illustrating the bending direction of a polyester film to be used in a polarizing plate for a foldable display of the present invention.

In the present invention, the refractive index of the polyester film in at least any one of its longitudinal direction (machine direction) and width direction is preferably from 1.590 to 1.620, more preferably from 1.591 to 1.600. In addition, when the polarizing plate is produced, the refractive index of the polyester film serving as the polarizer protective film in its bending direction is preferably from 1.590 to 1.620, more preferably from 1.591 to 1.600. Herein, as denoted by reference numeral 22 on a polyester film (reference numeral 2) in FIG. 2, the "bending direction" refers to a direction orthogonal to a folding portion (reference numeral 21) assumed in a foldable display application. A case in which the refractive index in at least any one of the longitudinal direction and the width direction is from 1.590 to 1.620 is preferred because deformation at the time of repeated folding is reduced to preclude a risk of reducing the image quality of the foldable display. The refractive index is more preferably from 1.591 to 1.600. Of course, the direction of the refractive index is preferably the above-mentioned bending direction. When the refractive index is 1.590 or more, there is no risk of cracking in the folding portion direction after a bending test to be described later, and as a matter of course, fracture does not occur either. Accordingly, the visibility of the display can be kept satisfactory. The refractive index of the polyester film can be effectively adjusted by adjusting the stretching ratios and the stretching temperatures. In addition, a relaxation step in a stretching direction or multi-stage stretching may be used in order to adjust the refractive index. When the multi-stage stretching is performed, it is preferred that a stretching ratio in a second or later stage be set to be higher than a stretching ratio in a first stage.

Fatigue due to a compressive stress applied to the inside of folding at the time of folding can be reduced by controlling the refractive index of the polyester film in at least any one of its longitudinal direction (machine direction) and width direction within the above-mentioned ranges, more preferably by controlling the refractive index in the bending direction within the above-mentioned ranges. The fatigue due to the compressive stress is considered to occur mainly in a crystalline portion, and a reduction in amount of crystals in the bending direction reduces the fatigue. Accordingly, it is conceived that, when the refractive index is decreased, the amount of crystals oriented in the bending direction is reduced to suppress the compression fatigue.

In addition, a creep phenomenon caused by a tensile stress applied to the outside of folding at the time of folding can be suppressed by reducing the refractive index. Fatigue due to the tensile stress is considered to occur mainly in an amorphous portion, and alignment of molecular chains due to repeatedly applied stress occurs to cause deformation. Presumably, as the number of molecular chains arranged in the bending direction becomes smaller, the deformation caused by the alignment reduces. In addition, as the amount of the amorphous portion becomes smaller, the tensile fatigue can be suppressed more, and hence a higher crystallinity, that is, a higher density is preferred.

In the present invention, the stretching ratio of an unstretched polyester sheet in at least any one of the longitudinal direction (machine direction) and the width direction is set to preferably from 1.2 times to 2.0 times, more preferably from 1.7 times to 2.0 times. in addition, the stretching direction is preferably the above-mentioned bending direction. A case in which the stretching ratio is 1.2 times or more is preferred because no deformation occurs in post-processing, such as hard coating application, and a case in which the stretching ratio is 2.0 times or less is preferred because thickness unevenness is prevented from occurring in the film. stretching temperature is preferably from 75° C. to 120° C., more preferably from 75° C. to 105° C. Hitherto known means, such as a hot-air heating system, a roll heating system, or an infrared heating system, may be adopted as a heating method at the time of the stretching. When the stretching temperature is set to from 75° C. to 120° C., large thickness unevenness due to the stretching at the above-mentioned stretching ratio can be prevented. In addition, when the stretching is performed at as low a temperature as possible within a range in which large thickness unevenness is prevented from occurring as described above, the refractive index in the thickness direction can be reduced.

(With Regard to Refractive Index in Folding Portion Direction)

The refractive index in the direction orthogonal to the above-mentioned direction in which the refractive index of the polyester film is from 1.590 to 1.620 is preferably from 1.670 to 1.700. That is, the refractive index in the direction (folding portion direction) orthogonal to the bending direction is preferably from 1.670 to 1.700. When the refractive index is set to from 1.670 to 1.700, deformation at the time of folding in the bending direction can be reduced. When the refractive index is set to 1.700 or less, cracking or fracturing in the folding portion direction can be suppressed. When the refractive index is set to 1.670 or more, bendability in the bending direction can be improved. The refractive index is more preferably from 1.680 to 1.695. As a method of adjusting the refractive index in the direction orthogonal to the bending direction, there are given a stretching ratio, a stretching preheating temperature, a stretching temperature, multi-stage stretching, and film relaxation. The stretching ratio is preferably from 4.0 times to 6.0 times, more preferably from 4.4 times to 6.0 times. in addition, the stretching preheating temperature in the direction orthogonal to the bending direction is preferably from 70° C. to 110° C. When multi-stage stretching is performed in the direction orthogonal to the bending direction, it is preferred that a stretching ratio in a second or later stage be set to be higher than that in a first stage. The film may be relaxed by from 1% to 10% in each of the machine direction (longitudinal direction) and the perpendicular direction (width direction).

(With Regard to Refractive Index in Thickness Direction)

The refractive index in the thickness direction is preferably 1.520 or less. When the refractive index is set to 1.520 or less, in-plane orientation can be strengthened, and deformation at the time of folding can be reduced. The refractive index is more preferably 1.515 or less, still more preferably 1.510 or less, particularly preferably 1.505 or less, most preferably 1.500 or less. The refractive index in the thickness direction is preferably low, but is preferably 1.3 or more from the viewpoint of stable production, and may be 1.4 or more. The refractive index is particularly preferably 1.110 or more. The above-mentioned range may be said to be achievable by increasing both of the stretching ratios in the bending direction and the folding direction, but in order to control the refractive index in the thickness direction while controlling the refractive indices in the bending direction and the width direction to preferred ranges, it is preferred to set conditions while checking a balance among the conditions of the steps of a film formation process.

As a method of controlling the refractive index in the thickness direction to the above-mentioned ranges, there is given a stretching preheating temperature, the stretching temperature, or the stretching ratio in the bending direction, the stretching preheating temperature or the stretching temperature in the folding portion direction, multi-stage stretching, high-ratio stretching, or a temperature setting for heat fixation. The stretching preheating temperature in the bending direction is preferably from 70° C. to 110° C. The stretching temperature in the bending direction is preferably from 75° C. to 120° C. The stretching ratio in the bending direction is preferably from 1.2 times to 2.0 times, more preferably from 1.7 times to 2.0 times. When stretching is performed at a low stretching temperature and a low stretching ratio, the refractive index in the thickness direction can be effectively decreased while the bendability in the bending direction is maintained. The stretching preheating temperature in the folding portion direction is also preferably from 75° C. to 110° C. The stretching temperature is preferably from 75° C. to 120° C. The stretching ratio in the folding portion is preferably from 4.0 times to 6.0 times, more preferably from 4.4 times to 6.0 times. While the refractive index in the bending direction is maintained or reduced, the refractive index in the thickness direction can be effectively reduced. Multi-stage stretching may be used as a method for high-ratio stretching. In that case, a stretching ratio in a second stage is preferably set to be higher than a stretching ratio in a first stage because the refractive index can be effectively controlled. In addition, a system involving performing stretching again after a crystallization step may be used. Accelerated stretching involving increasing stretching speed from an early stage of stretching to a late stage may be used.

The heat fixation temperature is preferably from 180° C. to 240° C. When heat fixation is performed, crystallization oriented in the stretching direction can proceed to decrease the refractive index in the thickness direction.

The reason why the hardness of the film surface is improved by decreasing the refractive index in the thickness direction is not necessarily clear, but it is conceivable that aromatics, such as benzene rings, in molecular chains are oriented in a plane direction to exhibit a suppressing effect on deformation due to stress applied in the thickness direction.

(With regard to Density of Polyester Film)

The density of the polyester film is preferably 1.380 g/cm$^3$ or more. The density is more preferably 1.383 g/cm$^3$ or more. When the density is set to 1.380 g/cm$^3$ or more, the bendability can be improved. The density is preferably as high as possible, and is preferably 1.40 g/cm$^3$ or less, though somewhat depending on, for example, the presence or absence of particles in the film. When the heat fixation temperature at the time of film formation is set to from 180° C. to 240° C., crystallization can be caused to proceed to effectively increase the density.

The bending direction of the polyester film is preferably caused to correspond to its longitudinal direction (machine direction). With this configuration, the refractive index in the bending direction can be easily decreased in second-axial stretching, and hence the bendability can be easily improved. That is, a preferred polyester film is obtained by stretching the unstretched polyester sheet in its longitudinal direction at a stretching ratio of from 1.2 times to 2.0 times, more preferably from 1.7 times to 2.0 times. In addition, it may be said that a preferred mode involves performing stretching in the width direction at a stretching ratio of from 4.0 times to 6.0 times, more preferably from 4.4 times to 6.0 times.

In addition, in the present invention, it may be said that, in a particularly preferred mode, the polyester film is caused to simultaneously have the following four characteristics:
(1) the refractive index in the bending direction is from 1.590 to 1.620;
(2) the refractive index in the folding portion direction is from 1.670 to 1.700;
(3) the refractive index in the thickness direction is 1.520 or less; and
(4) the density is 1.380 g/cm$^3$ or more.

However, even in the case of a combination within the ranges of the above-mentioned preferred production conditions, when the combination is a combination of conditions that cannot be said to be the best within the respective preferred production condition ranges, such as a combination of a stretching ratio in the bending direction of 1.4 times or less, a stretching ratio in the folding portion direction of less than 4.4 times, and a heat fixation temperature of 220° C. or less, a polyester film that simultaneously satisfies the above-mentioned four characteristics may not be necessarily obtained in some cases. In this case, the above-mentioned four characteristics can be simultaneously satisfied through a fine adjustment of any one of the conditions, such as an increase in stretching ratio in the bending direction to 1.7 times or more, an increase in stretching ratio in the folding portion direction to 4.4 times or more, an increase in heat fixation temperature to about 230° C., or a decrease in stretching temperature in the bending direction and/or the folding portion direction, or a combination thereof.

In order to adjust film formability, film strength, thermal dimensional stability, appearance failure, and the like, any film formation system involving, for example, stretching, relaxation, heat fixation, and surface treatment may be adopted, but it may be said that the control of the refractive indices and density of the film to the above-mentioned preferred ranges is a particularly preferred mode in the present invention. When the refractive indices and the density are controlled to the preferred ranges, there can be provided a polyester film suitable for a foldable display.

Specifically, for example, after the pellets of PET are sufficiently dried in vacuum, the pellets are fed into an extruder, and melt-extruded in a sheet shape at about 280° C., followed by cooling and solidifying the sheet to form an unstretched PET sheet. The obtained unstretched sheet is stretched at a ratio of from 1.2 times to 2.0 times, more preferably from 1.7 times to 2.0 times in the longitudinal direction with rolls heated to from 75° C. to 120° C. to obtain a uniaxially oriented PET film. Further, the film is held with clips at the end portions thereof, guided to a hot air zone heated to from 75° C. to 120° C., dried, and then stretched at a ratio of from 4.0 times to 6.0 times, more preferably from 4.4 times to 6.0 times in the width direction. Subsequently, the film may be guided to a heat treatment zone at from 180° C. to 240° C., and treated with heat for 1 second to 60 seconds. During this heat treatment step, the film may be subjected to relaxation treatment by from 0% to 10% in the width direction or the longitudinal direction as required.

The limiting viscosity of the polyester film preferably falls within the range of from 0.50 dl/g to 1.0 dl/g. A case in which the limiting viscosity is 0.50 dl/g or more is preferred because film formability is stabilized, and besides, impact resistance is improved, and hence a crack or the like due to an external impact hardly occurs. Meanwhile, a case in which the limiting viscosity is 1.00 dl/g or less is preferred because film production is stabilized without an excessively large increase in filtration pressure of molten fluid.

(Easy-to-Adhere Layer)

The polyester film may be provided with an easy-to-adhere layer (easy-to-adhere layer P1) in order to improve an adhesive property with a polarizing film or an alignment layer, which is described later.

Examples of a resin to be used in the easy-to-adhere layer include a polyester resin, a polyurethane resin, a polyester polyurethane resin, a polycarbonate resin, a polycarbonate polyurethane resin, and an acrylic resin. Of those, a polyester resin, a polyester polyurethane resin, a polycarbonate polyurethane resin, and an acrylic resin are preferred. The easy-to-adhere layer is preferably crosslinked with a crosslinking agent. Examples of the crosslinking agent include an isocyanate compound, a melamine compound, an epoxy resin, and an oxazoline compound. In addition, the addition of a resin similar to a resin used for the alignment layer or the polarizing film, such as polyvinyl alcohol, polyamide, polyimide, or polyamide imide, is also useful means for improving adhesiveness.

The easy-to-adhere layer may be formed by applying, to the polyester film, a water-based coating material obtained by adding any of those resins, and as required, a crosslinking agent, particles, or the like, and drying the coating material. Examples of the particles include the particles to be used for the substrate described above.

The easy-to-adhere layer may be formed off line on the substrate film that has been stretched, or may be formed in line during a film formation step. The easy-to-adhere layer is preferably arranged in line during the film, formation step. When formed in line, the easy-to-adhere layer may be formed before longitudinal stretching or before lateral stretching. In particular, it is preferred that the water-based coating material be applied immediately before lateral stretching, and preheated and heated with a tenter to be dried and crosslinked during the heat treatment step, to thereby form the easy-to-adhere layer in line. When in-line coating is performed immediately before longitudinal stretching with a roll, it is preferred that the water-based coating material be applied, and then dried with a vertical dryer, followed by being led to the stretching roll. The application amount of the water-based coating material is preferably from 0.01 /m² to 1.0 g/m², more preferably from 0.03 g/m² to 0.5 g/m².

(Functional Layer)

It is also a preferred mode that a functional layer, such as a hard coating layer, an antireflection layer, a low-reflection layer, an antiglare layer, or an antistatic layer, is arranged on the opposite side of the polyester film to its surface on which the polarizing film is laminated.

The thickness of such functional layer may be appropriately set, and is preferably from 0.1 µm to 50 µm, more preferably from 0.5 µm to 20 µm, still more preferably from 1 µm to 10 µm. A plurality of those layers may be arranged.

When the functional layer is arranged, an easy-to-adhere layer (easy-to-adhere layer P2) may be arranged between the functional layer and the substrate film. The resins, the crosslinking agents, and the like given for the above-mentioned easy-to-adhere layer P1 are suitably used for the easy-to-adhere layer P2. In addition, the easy-to-adhere layer P1 and the easy-to-adhere layer P2 may have the same composition, or may have different compositions.

The easy-to-adhere layer P2 is also preferably formed in line. The easy-to-adhere layer P1 and the easy-to-adhere layer P2 may be sequentially formed through application and drying. In addition, it is also a preferred mode that the easy-to-adhere layer P1 and the easy-to-adhere layer P2 are simultaneously applied to both surfaces of the polyester film.

In the following description, when the term "polarizer protective film" or "polyester film" is used, the term includes not only a film provided with no easy-to-adhere layer, but also a film provided with the easy-to-adhere layer(s). Similarly, a film provided with the functional layer is also included in the polarizer protective film or the polyester film.

2. Polarizer

The polarizer (polarizing film) of the polarizing plate to be used in the present invention may be directly arranged on the polarizer protective film, or may be arranged on an alignment layer arranged on the polarizer protective film. In the present invention, the alignment film and the polarizing film are sometimes collectively referred to as "polarizer". In addition, when the polarizing film is arranged without the alignment film being arranged on the polarizer protective film, the polarizing film is sometimes referred to as "polarizer".

(Polarizing Film)

The polarizing film has a function of allowing polarized light to pass therethrough only in one direction. As the polarizing film, there may be used, without any particular limitation, a stretched film of polyvinyl alcohol (PVA) or the like having iodine or a dichroic dye blended thereinto, a dichroic dye film or an application film of a polymerizable liquid crystal compound blended with a dichroic dye, a stretched film of polyene, a wire grid, or the like.

Of those, a polarizing film obtained by adsorbing iodine onto PVA, and a polarizing film of a polymerizable liquid crystal compound blended with a dichroic dye are preferred examples.

First, the polarizing film obtained by adsorbing iodine onto PVA is described.

The polarizing film obtained by adsorbing iodine onto PVA may be generally obtained by immersing an unstretched film of PVA in a bath containing iodine, and then uniaxially stretching the film, or by immersing an uniaxially stretched film of PVA in a bath containing iodine, and then subjecting the film to crosslinking treatment in a boric acid bath.

The thickness of the polarizing film is preferably from 1 µm to 30 µm, more preferably from 1.5 µm to 20 µm, still more preferably from 2 µm to 15 µm. When the thickness of the polarizing film is less than 1 µm, a sufficient polarization characteristic cannot be exhibited, and besides, the polarizing film is so thin that its handling may be difficult in some cases. A case in which the thickness of the polarizing film is more than 30 µm is not fit for the purpose of thinning for securing flexibility.

When the polarizing film obtained by adsorbing iodine onto PVA and the polarizer protective film are laminated, the polarizer protective film and the polarizing film are preferably bonded to each other. Any of hitherto used tackifiers may be used as a tackifier for the bonding without any limitation. Of those, a PVA-based aqueous tackifier, a UV-curable tackifier, and the like are preferred examples, and a UV-curable tackifier is more preferred.

As described above, the polarizing film obtained by adsorbing iodine onto PVA may be, through use of the film serving as the polarizer alone, laminated with the polarizer protective film. Alternatively, lamination may be performed by a method involving applying PVA onto a releasable support substrate, performing stretching in this state, and using the thus obtained polarizer laminated on the releasable support substrate (releasable support substrate-laminated polarizer) to transfer the polarizing film onto the polarizer protective film. The method involving performing lamination by transfer, as well as the above-mentioned bonding method, is preferred as a method of laminating the polarizer and the polarizer protective film. In the case of the transfer method, the thickness of the polarizer is preferably 12 µm or less, more preferably 10 µm or less, still more preferably 8 µm or less, particularly preferably 6 µm or less. Even such extremely thin polarizer is easy to handle by virtue of the presence of the releasable support substrate, and hence the polarizer can be easily laminated on the polarizer protective film. When such thin polarizer is used, repeated flexibility can be further secured. A technology for laminating the polarizer and the polarizer protective film is known, and reference may be made to, for example, JP 2001-350021 A and JP 2009-93074 A.

The method involving laminating the polarizer and the polarizer protective film by transfer is specifically described. First, PVA is applied to a releasable support substrate of a thermoplastic resin that is unstretched or uniaxially stretched perpendicularly to its longitudinal direction, and the resultant laminate of the releasable support substrate of a thermoplastic resin and PVA is stretched in its longitudinal direction at a ratio of from 2 times to 20 times, preferably from 3 times to 15 times. A stretching temperature is preferably from 80° C. to 180° C., more preferably from 100° C. to 160° C. Subsequently, the stretched laminate is immersed in a bath containing a dichroic dye to adsorb the dichroic dye. Examples of the dichroic dye include iodine and an organic dyestuff. When iodine is used as the dichroic dye, an aqueous solution containing iodine and potassium iodide is preferably used as a dyeing bath. Subsequently, the laminate is treated by being immersed in an aqueous solution of boric acid, and is washed with water, followed by drying. Stretching at a ratio of from 1.5 times to 3 times may be performed as preliminary stretching before the adsorption of the dichroic dye. The above-mentioned method is merely an example. The adsorption of the dichroic dye may be performed before the stretching, and the treatment with boric acid may be performed before the adsorption of the dichroic dye. The stretching may be performed in a bath containing the dichroic dye or in a bath of an aqueous solution of boric acid. In addition, those steps may be divided into pluralities of stages and performed as a combination thereof.

As the releasable support substrate (release film) of a thermoplastic resin, for example, a polyester film, such as a polyethylene terephthalate film, a polyolefin film, such as a polypropylene film or a polyethylene film, a polyamide film, or a polyurethane film is used. The releasable support substrate (release film) of a thermoplastic resin may be subjected to corona treatment or provided with a release coating, an adhesion-facilitating coating, or the like, to thereby adjust peel strength.

The polarizer surface of the releasable support substrate-laminated polarizer is bonded to the polarizer protective film via an adhesive or a tackifier, and then the releasable support substrate is peeled off to provide a laminate of the polarizer protective film and the polarizer. The thickness of a generally used adhesive is from 5 µm to 50 µm, whereas the thickness of a generally used tackifier is from 1 µm to 10 µm. The tackifier is preferably used for the purpose of thinning, and in particular, a UV-curable tackifier is more preferably used. It is also preferred to use the adhesive from the viewpoint of a process because no special apparatus is required.

Next, the polarizing film of a polymerizable liquid crystal compound blended with a dichroic dye is described.

The "dichroic dye" refers to a dye having the following property: the absorbance of its molecule in the long axis direction thereof differs from the absorbance in the short axis direction thereof.

The dichroic dye preferably has an absorption maximum wavelength (λMAX) within the range of from 300 nm to 700 nm. Examples of such dichroic dye include organic dichroic dyes, such as an acridine dye, an oxazine dye, a cyanine dye, a naphthalene dye, an azo dye, and an anthraquinone dye. Of those, an azo dye is preferred. Examples of the azo dye include a monoazo dye, a bisazo dye, a trisazo dye, a tetrakisazo dye, and a stilbene azo dye. Of those, a bisazo dye and a trisazo dye are preferred. The dichroic dyes may be used alone or in combination thereof. In order to adjust a color tone (to an achromatic color), it is preferred to combine two or more kinds thereof, and it is more preferred to combine three or more kinds thereof. It is particularly preferred to use three or more kinds of azo compounds in combination.

The azo compound is preferably a dye described in, for example, JP 2007-126628 A, JP 2010-168570 A, JP 2013-101328 A, or JP 2013-210624 A.

A dichroic dye polymer obtained by introducing the dichroic dye into a side chain of a polymer, such as an acrylic polymer, is also a preferred mode. Examples of such dichroic polymer may include polymers given in JP 2016-4055 A, and polymers obtained by polymerizing compounds of [Chem 6] to [Chem 12] of JP 2014-206682 A.

The content of the dichroic dye in the polarizing film is preferably from 0.1 mass % to 30 mass %, more preferably from 0.5 mass % to 20 mass %, still more preferably from 1.0 mass % to 15 mass %, particularly preferably from 2.0 mass % to 10 mass % in the polarizing film from the viewpoint of achieving satisfactory alignment of the dichroic dye.

The polarizing film preferably contains a polymerizable liquid crystal compound in order to improve film strength, the degree of polarization, film homogeneity, and the like. The polymerizable liquid crystal compound also includes a product that has been polymerized as a film.

The "polymerizable liquid crystal compound" refers to a compound having a polymerizable group and showing liquid crystallinity.

The "polymerizable group" means a group to be involved in a polymerization reaction, and the polymerizable group is preferably a photopolymerizable group. Herein, the "photopolymerizable group" refers to a group capable of undergoing a polymerization reaction caused by an active radical, an acid, or the like generated from a photopolymerization initiator to be described later. Examples of the polymerizable group include a vinyl group, a vinyloxy group, a 1-chlorovinyl group, an isopropenyl group, a 4-vinylphenyl group, an acryloyloxy group, a methacryloyloxy group, an oxiranyl group, and an oxetanyl group. Of those, an acryloyloxy group, a methacryloyloxy group, a vinyloxy group, an oxiranyl group, and an oxetanyl group are preferred, and an acryloyloxy group is more preferred. The compound showing liquid crystallinity may be a thermotropic liquid crystal or a lyotropic liquid crystal, and may be a nematic liquid crystal or a smectic liquid crystal among thermotropic liquid crystals.

The polymerizable liquid crystal compound is preferably a smectic liquid crystal compound from the viewpoint of obtaining a higher polarization characteristic, and is more preferably a higher-order smectic liquid crystal compound. When a liquid crystal phase formed by the polymerizable liquid crystal compound is a higher-order smectic phase, a polarizing film having a higher degree of orientation order can be produced.

Preferred specific examples of the polymerizable liquid crystal compound include compounds described in JP 2002-308832 A, JP 2007-16207 A, JP 2015-163596 A, JP 2007-510946 A, JP 2013-114131 A, WO 2005/045485 A1, and Lub et al. Recl. Tray, Chim, Pays-Bas, 115, 321-328 (1996).

The content ratio of the polymerizable liquid crystal compound in the polarizing film is preferably from 70 mass % to 99.5 mass %, more preferably from 75 mass % to 99 mass %, still more preferably from 80 mass % to 97 mass %, particularly preferably from 83 mass % to 95 mass % in the polarizing film from the viewpoint of enhancing the alignment property of the polymerizable liquid crystal compound.

The polarizing film containing the polymerizable liquid crystal compound and the dichroic dye may be formed by applying a composition for a polarizing film.

The composition for a polarizing film may contain, in addition to the polymerizable liquid crystal compound and the dichroic dye, a solvent, a polymerization initiator, a sensitizer, a polymerization inhibitor, a leveling agent, and a polymerizable non-liquid crystal compound, a crosslinking agent, and the like.

As the solvent, any solvent capable of dissolving the polymerizable liquid crystal compound may be used without any limitation. Specific examples of the solvent include: water; alcohol-based solvents, such as methanol, ethanol, isopropyl alcohol, ethylene glycol, propylene glycol, and cellosolve; ester-based solvents, such as ethyl acetate, butyl acetate, and γ-butyrolactone; ketone-based solvents, such as acetone, methyl ethyl ketone, cyclopentanone, and cyclohexanone; aromatic hydrocarbon solvents, such as toluene and xylene; and ether-based solvents, such as tetrahydrofuran and dimethoxyethane. Those solvents may be used alone or in combination thereof.

As the polymerization initiator, any polymerization initiator that causes the polymerizable liquid crystal compound to polymerize may be used without any limitation. The polymerization initiator is preferably a photopolymerization initiator that generates an active radical by light. Examples of the polymerization initiator include a benzoin compound, a benzophenone compound, an alkylphenone compound, an acylphosphine oxide compound, a triazine compound, an iodonium salt, and a sulfonium salt.

The sensitizer is preferably a photosensitizer. Examples of the photosensitizer include a xanthone compound, an anthracene compound, phenothiazine, and rubrene.

Examples of the polymerization inhibitor include hydroquinones, catechols, and thiophenols.

Examples of the leveling agent include various known surfactants.

The polymerizable non-liquid crystal compound is preferably copolymerizable with the polymerizable liquid crystal compound. For example, when the polymeriable liquid crystal compound has a (meth)acryloyloxy group, an example of the polymerizable non-liquid crystal compound is a (meth) acrylate. The (meth) Acrylate may be monofunctional or polyfunctional. The use of the polyfunctional (meth)acrylate can improve the strength of the polarizing film. When the polymerizable non-liquid crystal compound is used, its content in the polarizing film is set to preferably from 1 mass % to 15 mass %, more preferably from 2 mass % to 10 mass %, still more preferably from 3 mass % to 7 mass %. When the content of the polymerizable non-liquid crystal compound is more than 15 mass %, the degree of polarization is reduced in some cases.

An example of the crosslinking agent is a compound capable of reacting with a functional group of the polymerizable liquid crystal compound or the polymerizable non-liquid crystal compound. Specific examples of the crosslinking agent include an isocyanate compound, melamine, an epoxy resin, and an oxazoline compound.

The composition for a polarizing film is directly applied onto the polarizer protective film or onto the alignment layer, then dried as required, and heated to be cured. Thus, the polarizing film is formed.

As a method for the application, there may be adopted known methods including: application methods, such as a gravure coating method, a die coating method, a bar coating method, and an applicator method; and printing methods, such as a flexographic method.

The drying is performed by introducing the polarizer protective film after the application into a hot-air dryer, an infrared dryer, or the like, and is performed at preferably from 30° C. to 170° C., more preferably from 50° C. to 150° C., still more preferably from 70° C. to 130° C. A drying time is preferably from 0.5 minute to 30 minutes, more preferably from 1 minute to 20 minutes, still more preferably from 2 minutes to 10 minutes.

The heating may be performed in order to more strongly align molecules of the dichroic dye and the polymerizable liquid crystal compound in the polarizing film. A heating temperature is preferably set within a temperature range in which the polymerizable liquid crystal compound forms a liquid crystal phase.

The composition for a polarizing film contains the polymerizable liquid crystal compound, and hence is preferably cured. As a method for the curing, there are given heating and photoirradiation. Of those, photoirradiation is preferred. The curing allows the dichroic dye to be fixed in an alignment state. The curing is preferably performed under a state in which the polymerizable liquid crystal compound is allowed to form a liquid crystal phase, and the curing may be performed through photoirradiation at a temperature at which a liquid crystal phase is exhibited.

Examples of light in the photoirradiation include visible light, UV light, and laser light. UV light is preferred from the viewpoint of the ease of handling.

An irradiation intensity varies depending on the kind or amount of the polymerization initiator or resin (monomer), and is, for example, preferably from 100 mJ/cm$^2$ to 10,000 mJ/cm$^2$, more preferably from 200 mJ/cm$^2$ to 5,000 mJ/cm$^2$ in terms of 365 nm.

When the composition for a polarizing film is applied onto the alignment layer that is arranged as required, the molecules of the dye are aligned along the alignment direction of the alignment layer, with the result that the polarizing film has a polarized light transmission axis in a predetermined direction. When the composition for a polarizing film is directly applied to the substrate without the arrangement of the alignment layer, the polarizing film may be oriented by curing the composition for a polarizing film through irradiation with polarized light. In this case, the polarized light is radiated in an oblique direction with respect to the elongate direction of the polarizer protective film. Further, after that, heating treatment is preferably performed to strongly align the molecules of the dichroic dye along the alignment direction of polymer liquid crystals.

The thickness of the polarizing film is generally from 0.1 µm to 5 µm, preferably from 0.3 µm to 3 µm, more preferably from 0.5 µm to 2 µm.

When the polarizing film containing the polymerizable liquid crystal compound and the dichroic dye is laminated with the polarizer protective film, not only a method involving performing the lamination by directly arranging the polarizing film on the substrate film, but also a method involving arranging the polarizing film on a separate release film in conformity with the above-mentioned method, and transferring the polarizing film onto the polarizer protective film is preferred. A preferred example of the release film is the releasable support substrate used in the releasable support substrate-laminated polarizer laminated with the releasable support substrate described above, and a particularly preferred example of the release film is a polyester film or a polypropylene film. The release film may be subjected to corona treatment or provided with a release coating, an adhesion-facilitating coating, or the like, to thereby adjust peel strength.

The method involving transferring the polarizing film onto the polarizer protective film is also similar to the method in the releasable support substrate-laminated polarizer laminate with the releasable support substrate described above.

(Alignment Layer)

As described above, the polarizer to be used in the present invention may be the polarizing film alone, or may be formed of a combination of the polarizing film and the alignment layer.

The alignment layer controls the alignment direction the polarizing film. When the alignment layer is arranged, a polarizer having a higher degree of polarization can be provided.

The alignment layer may be any alignment layer that allows the polarizing film to be brought into a desired alignment state. As a method of imparting an alignment state to the alignment layer, there are given, for example, rubbing treatment of a surface, oblique deposition of an inorganic compound, and formation of a layer having microgrooves. Further, a method involving aligning molecules through photoirradiation with polarized light to provide a photoalignment layer exhibiting an aligning function is also preferred.

Two examples, i.e., a rubbing-treated alignment layer and a photoalignment layer are described below.

(Rubbing-Treated Alignment Layer)

As a polymer material to be used for the alignment layer to be formed by the rubbing treatment, there are preferably used polyvinyl alcohol and a derivative thereof, polyimide and a derivative thereof, an acrylic resin, a polysiloxane derivative, and the like.

First, an application liquid for a rubbing-treated alignment layer, which contains the above-mentioned polymer material, is applied onto the polarizer protective film, followed by heat drying or the like to provide an alignment layer before rubbing treatment. The application liquid for an alignment layer may contain a crosslinking agent. Examples of the crosslinking agent include: a compound containing a plurality of groups such as an isocyanate group, an epoxy group, an oxazoline group, a vinyl group, an acrylic group, a carbodiimide group, and an alkoxysilyl group; an amide resin, such as a melamine compound; and a phenol resin.

As the solvent of the application liquid for a rubbing-treated alignment layer, any solvent capable of dissolving the polymer material may be used without any limitation. Specific examples of the solvent include: water; alcohol-based solvents, such as methanol, ethanol, isopropyl alcohol, ethylene glycol, propylene glycol, and cellosolve; ester-based solvents, such as ethyl acetate, butyl acetate, and γ-butyrolactone; ketone-based solvents, such as acetone, methyl ethyl ketone, cyclopentanone, and cyclohexanone; aromatic hydrocarbon solvents, such as toluene and xylene; and ether-based solvents, such as tetrahydrofuran and dimethoxyethane. Those solvents may be used alone or in combination thereof.

The concentration of the application liquid for a rubbing-treated alignment layer may be appropriately adjusted depending on the kind of the polymer, the thickness of the alignment layer to be produced, and the like. The concentration is preferably set to from 0.2 mass % to 20 mass % in terms of solid content concentration, and more preferably falls within the range of from 0.3 mass % to 10 mass %.

As a method for the application, there are adopted known methods including: application methods, such as a gravure coating method, a die coating method, a bar coating method, and an applicator method; and printing methods, such as a flexographic method.

The temperature of the heat drying depends on the polarizer protective film, but in the case of PET, falls within preferably the range of from 30° C. to 170° C., more preferably the range of from 50° C. to 150° C., still more preferably the range of from 70° C. to 130° C. When the drying temperature is excessively low, a need to take a long drying time arises, resulting in poor productivity in some cases. When the drying temperature is excessively high, the alignment state of the polarizer protective film is affected, resulting in a problem such as a failure to achieve an optical function as designed, or a degradation in flatness. A heat drying time is generally from 0.5 minute to 30 minutes, preferably from 1 minute to 20 minutes, more preferably from 2 minutes to 10 minutes.

The thickness of the rubbing-treated alignment layer is preferably from 0.01 µm to 10 µm, more preferably from 0.05 µm to 5 µm, still more preferably from 0.1 µm to 1 µm.

The rubbing treatment may be generally performed by rubbing the surface of a polymer layer with paper or cloth in a certain direction. In general, the surface of the alignment film is subjected to the rubbing treatment using a rubbing roller of raised cloth of a fiber of nylon, polyester, acryl, or the like.

In order to form a polarizing film having a transmission axis in a predetermined direction oblique with respect to the longitudinal direction of an elongate polarizer protective film, the angle of the rubbing direction of the alignment layer also needs to be set accordingly. The angle may be adjusted by, for example, adjusting an angle between the rubbing roller and the polarizer protective film, or adjusting the conveying speed of the polarizer protective film and the number of rotations of the roller.

The polarizer protective film may be directly subjected to the rubbing treatment to impart an alignment layer function to the surface of the polarizer protective film. This case is also included in the technical scope of the present invention.

(Photoalignment Layer)

The "photoalignment layer" refers to an alignment film having an alignment-regulating force imparted thereto by applying an application liquid containing a polymer or monomer having a photoreactive group and a solvent to a substrate film, and irradiating the application liquid with polarized light, preferably polarized UV light. The "photoreactive group" refers to a group that engenders a liquid crystal-aligning ability through photoirradiation. Specifically, the photoreactive group causes a photoreaction serving as the origin of a liquid crystal-aligning ability, such as a molecular alignment induction or isomerization reaction, a dimerization reaction, a photocrosslinking reaction, or a photodecomposition reaction, which occurs through photoirradiation. Of such photoreactive groups, one that causes a dimerization reaction or a photocrosslinking reaction is preferred from the viewpoints of being excellent in alignment property and keeping the smectic liquid crystal state of the polarizing film. The photoreactive group capable of causing such reaction as described above is preferably an unsaturated bond, in particular, a double bond, particularly preferably a group having at least one selected from the group consisting of: a C═C bond; a C═N bond; a N═N bond; and a C═O bond.

Examples of the photoreactive group having a C═C bond include a vinyl group, a polyene group, a stilbene group, a stilbazole group, a stilbazolium group, a chalcone group, and a cinnamoyl group. Examples of the photoreactive group having a C═N bond include groups each having a structure such as an aromatic Schiff base and an aromatic hydrazone. Examples of the photoreactive group having a N═N bond include an azobenzene group, an azonaphthalene group, an aromatic heterocyclic azo group, a bisazo group, a formazan group, and a group having azoxybenzene as a basic structure. Examples of the photoreactive group having a C═O bond include a benzophenone group, a coumarin group, an anthraquinone group, and a maleimide group. Each of those groups may have a substituent, such as an alkyl group, an alkoxy group, an aryl group, an allyloxy group, a cyano group, an alkoxycarbonyl group, a hydroxyl group, a sulfonic acid group, and a halogenated alkyl group.

Of those, a photoreactive group capable of causing a photodimerization reaction is preferred, and a cinnamoyl group and a chalcone group are preferred because of requiring a relatively small irradiation amount of polarized light for photoalignment, and facilitating the provision of an photoalignment layer excellent in thermal stability or temporal stability. Further, the polymer having a photoreactive group particularly preferably has such a cinnamoyl group that the end of a side chain of the polymer has a cinnamic acid structure. Examples of the structure of the main chain thereof include polyimide, polyamide, (meth)acryl, and polyester.

Specific examples of the alignment layer include alignment layers described in JP 2006-285197 A, JP 2007-76839 A, JP 2007-138138 A, JP 2007-94071 A, JP 2007-121721 A, JP 2007-140465 A, JP 2007-156439 A, JP 2007-133184 A, JP 2009-109831 A, JP 2002-229039 A, JP 2002-265541 A, JP 2002-317013 A, JP 2003-520878 A, JP 2004-529220 A, JP 2013-33248 A, JP 2015-7702 A, and JP 2015-129210 A.

As the solvent of the application liquid for photoalignment layer formation, any solvent capable of dissolving the polymer and monomer having a photoreactive group may be used without any limitation. Specific examples of the solvent may include those given for the rubbing-treated alignment layer. As required, a photopolymerization initiator, a polymerization inhibitor, various stabilizers, or the like may also be added to the application liquid for photoalignment layer formation. In addition, a polymer other than the polymer and monomer having a photoreactive group, a monomer having no photoreactive group copolymerizable with the monomer having a photoreactive group, or the like may be added to the application liquid for photoalignment layer formation.

Examples of the concentration, application method, drying conditions, and the like of the application liquid for photoalignment layer formation may include those given for the rubbing-treated alignment layer. The thickness of the photoalignment layer is also similar to the preferred thickness of the rubbing-treated alignment layer.

The thus obtained photoalignment layer before alignment is irradiated with polarized light in a predetermined oblique direction with respect to the longitudinal direction of the polarizer protective film. Thus, a photoalignment layer having an alignment-regulating force directed in an oblique direction with respect to the longitudinal direction of the elongate polarizer protective film may be obtained.

The polarized light may be directly radiated to the photoalignment layer before alignment, or may be transmitted through the polarizer protective film before being radiated.

The wavelength of the polarized light preferably falls within a wavelength region in which the photoreactive group of the polymer or monomer having a photoreactive group can absorb light energy. Specifically, UV light having a wavelength within the range of from 250 nm to 400 nm is preferred.

As a light source of the polarized light, there are given, for example, a xenon lamp, a high-pressure mercury lamp, an ultra-high pressure mercury lamp, a metal halide lamp, and a UV laser of KrF, ArF, or the like. Of those, a high-pressure mercury lamp, an ultra-high pressure mercury lamp, and a metal halide lamp are preferred.

The polarized light may be obtained by, for example, causing light from the light source to pass through a polarizer. The direction of the polarized light may be adjusted by adjusting the polarization angle of the polarizer. Examples of the polarizer include: a polarizing filter; a polarizing prism, such as a Glan-Thompson polarizing prism or a Glan-Taylor polarizing prism; and a wire grid-type polarizer. It is preferred that the polarized light be substantially parallel light.

The direction of the alignment-regulating force of the photoalignment layer may be adjusted to any direction by adjusting the angle of the polarized light to be radiated.

An irradiation intensity varies depending on the kind or amount of the polymerization initiator or resin (monomer), and is, for example, preferably from 10 mJ/cm$^2$ to 10,000 mJ/cm$^2$, more preferably from 20 mJ/cm$^2$ to 5,000 mJ/cm$^2$ in terms of 365 nm.

(Angle Between Transmission Axis of Polarizer and Slow Axis of Polarizer Protective Film)

An angle between the transmission axis of the polarizer and the slow axis of the polarizer protective film is not particularly limited. For the purpose of preventing a blackout or coloration in the case of viewing an image with polarized sunglasses on, the angle falls within preferably the range of from 30° to 60°, more preferably the range of from 35° to 55°. In order to reduce slight rainbow unevenness or the like in the case of observation with the naked eye from an oblique direction at a shallow angle, the angle between the axes is preferably set to 10° or less, further, 7° or less, or set to from 80° to 100°, further, from 83° to 97°. Such angle may be adjusted on the basis of a bonding angle between the polarizer protective film and the polarizer, the stretching direction of oblique stretching of the polarizer protective film, or the angle of alignment control of the alignment layer.

3. Retardation Layer

In the present invention, it is also a preferred mode that a retardation layer is laminated on the polarizing plate.

The retardation layer may be preferably laminated on one surface of a polarizing plate having polarizer protective films on both surfaces of the polarizer, but it is preferred that the polarizer protective film be laminated on one surface of the polarizer, and the retardation layer be arranged on the other surface of the polarizer. When such mode is adopted to achieve thinning, high flexibility can be satisfied to reduce the risk of forming a fold mark at the time of folding.

When the foldable display is a liquid crystal display, a retardation layer to be generally used for a liquid crystal display, such as a positive or negative A-plate, a positive or negative C-plate, or a tilt alignment layer of a discotic liquid crystal compound, may be used as the retardation layer in accordance with the type of the liquid crystal cell.

When the foldable display is an organic EL display or the like, the retardation layer is preferably a quarter-wave layer in order to obtain a circularly polarizing plate for preventing reflection.

The retardation layer is described below by taking, as a typical example, the circularly polarizing plate in which the retardation layer is the quarter-wave layer.

In the circularly polarizing plate, the retardation layer is present on the opposite side of the polarizer to the polarizer protective film surface. A state in which no or only one self-supporting film is present between the polarizer and the retardation layer (in this case, the retardation layer itself is also included in "between the polarizer and the retardation layer") is preferred. Herein, the "self-supporting film" refers to a film of such a form as to be independently present as a film during a process.

In addition, the term "retardation layer" as used herein refers to a layer for imparting a function as a circularly polarizing plate, and specifically means a quarter-wave layer, a half-wave layer, a C-plate, or the like.

That no self-supporting film is present between the polarizer and the retardation layer means that a retardation layer that is not a self-supporting film is directly laminated on the polarizer. The term "directly" as used in this case means that no layer is present in any of the spaces between the polarizer and the retardation layers, and between the retardation layers, or only a tackifier layer or an adhesive layer, if any, is present.

That one self-supporting film is present between the polarizer and the retardation layer means that only one out of the polarizer protective film and all retardation layers is a self-supporting film.

The quarter-wave layer may be obtained by bonding an alignment film (self-supporting film) of polycarbonate, cycloolefin, or the like, or a retardation film (self-supporting film) obtained by arranging, on a film of any such material or a triacetylcellulose (TAC)-based film, a separately prepared application-type quarter-wave layer to be described later. However, from the viewpoint of thinning, it is preferred that the application-type quarter-wave layer be directly arranged on the polarizer.

The "application-type quarter-wave layer" refers to a quarter-wave layer that itself is formed by application, and that is not brought into a state of being independent as a single body. As a method of arranging the quarter-wave layer, there are given, for example, a method involving applying a compound exhibiting a retardation onto the polarizer, and a method involving separately arranging the quarter-wave layer on a substrate having releasability, and transferring the layer onto the polarizer. The quarter-wave layer is preferably a layer formed of a liquid crystal compound. Examples of the liquid crystal compound include a rod-like liquid crystal compound, a polymeric liquid crystal compound, and a liquid crystal compound having a reactive functional group. As the method involving applying a compound exhibiting a retardation onto the polarizer, it is preferred that the polarizer be subjected to rubbing treatment, or the polarizer be provided with such alignment layer as described above, to thereby impart an alignment control ability, and then the liquid crystal compound be applied.

In the method involving separately arranging the application-type quarter-wave layer on a releasable substrate, and transferring the layer onto the polarizer, it is preferred that the substrate having releasability be subjected to rubbing treatment, or the releasable substrate be provided with such alignment layer as described above, to thereby impart an alignment control ability, and then the liquid crystal compound (quarter-wave layer) be applied.

In addition, as a method involving transfer, a method involving applying a birefringent resin to a substrate having releasability, and stretching the whole, including the substrate, to form the quarter-wave layer is also preferred.

The thus obtained transfer-type quarter-wave layer is bonded to the polarizer using a tackifier or an adhesive, and then the releasable substrate is peeled off. For the purpose of thinning, the bonding is preferably performed using the tackifier, in particular, a UV-curable tackifier. It is also preferred to use the adhesive from the viewpoint of a process because no special apparatus is required.

From the viewpoint that the polarizer is less liable to be affected by an application solvent for the quarter-wave layer, the method involving separately arranging the application-type quarter-wave layer on a releasable substrate, and transferring the layer onto the polarizer is preferred.

The front retardation of the quarter-wave layer is preferably from 100 nm to 180 nm, more preferably from 120 nm to 150 nm.

For those methods and the retardation layer, reference may be made to, for example, JP 2008-149577 A, JP 2002-303722 A, WO 2006/100830 A1, and JP 2015-64418 A.

In addition, the quarter-wave layer alone does not provide a quarter wave over a wide wavelength region of visible light, leading to coloration in some cases. In such cases, the half-wave layer may be further arranged. In this case, the half-wave layer is preferably arranged between the polarizer and the quarter-wave layer.

Preferred materials, forms, production methods, lamination methods, and the like of the half-wave layer are similar to those of the quarter-wave layer described above.

The front retardation of the half-wave layer is preferably from 200 nm to 360 nm, more preferably from 240 nm to 300 nm.

When only the quarter-wave layer is used as the retardation layer, an angle between the alignment axis (slow axis) of the quarter-wave layer and the transmission axis of the polarizer is preferably from 35° to 55°, more preferably from 40° to 50°, still more preferably from 42° to 48°.

When the quarter-wave layer and the half-wave layer are used in combination as the retardation layer, an angle (θ) between the alignment axis (slow axis) of the half-wave layer and the transmission axis of the polarizer is preferably from 5° to 20°, more preferably from 7° to 17°. An angle between the alignment axis (slow axis) of the half-wave layer and the alignment axis (slow axis) of the quarter-wave layer falls within preferably the range of 2θ+45°±10°, more preferably the range of 2θ+45°±5°, still more preferably the range of 2θ+45°±3°.

In the case where the alignment film is bonded, those angles may be adjusted on the basis of the angle of the bonding, the stretching direction of the alignment film, and the like.

In the case of the application-type quarter-wave layer and the half-wave layer, those angles may be controlled on the basis of the angle of rubbing, the irradiation angle of polarized UV light, and the like.

In the method involving arranging the application-type quarter-wave layer on a substrate, and transferring the layer onto the polarizer, it is preferred that control be performed on the basis of the angle of rubbing or the irradiation angle of polarized UV light so that predetermined angles may be achieved when bonding is performed in a roll-to-roll manner.

In addition, in the case of using the alignment film, and in the case of applying a birefringent resin to the polarizer protective film, and stretching the whole, including the substrate, it is preferred that stretching be performed in an oblique direction so that predetermined angles may be achieved when bonding is performed in a roll-to-roll manner.

Further, in order to reduce, for example, a change in coloration in the case of viewing from an oblique direction, it is also a preferred mode that a C-plate layer is arranged on the quarter-wave layer. As the C-plate layer, a positive or negative C-plate layer is used in accordance with the characteristics of the quarter-wave layer or the half-wave layer. The C-plate layer is preferably a liquid crystal compound layer. The C-plate layer may be formed by directly applying an application liquid for forming a C-plate layer onto the quarter-wave layer, or a separately produced C-plate layer may be transferred.

Various methods may be adopted as a method of laminating those layers. Examples thereof include the following methods.

A method involving arranging the half-wave layer on the polarizer by transfer, and further arranging the quarter-wave layer thereon by transfer.

A method involving arranging the quarter-wave layer and the half-wave layer on a release film in the stated order, and transferring the layers onto the polarizer.

A method involving arranging the half-wave layer on the polarizer by application, and arranging the quarter-wave layer by transfer.

A method involving preparing the half-wave layer as a film, arranging the quarter-wave layer thereon by application or transfer, and bonding the layers onto the polarizer.

In addition, also when the C-plate is laminated, various methods may be adopted. Examples thereof include a method involving arranging the C-plate layer by application or transfer on the quarter-wave layer arranged on the polarizer, and a method involving laminating the C-plate layer in advance on the quarter-wave layer to be transferred or bonded.

In the present invention, it is preferred that all layers between the polarizer and the quarter-wave layer (including the quarter-wave layer), or when the C-plate layer is present, all layers between the polarizer and the C-plate layer (including the C-plate layer) be applied layers. This means that no self-supporting film is present on the opposite side of the polarizer to the polarizer protective film. It is specifically meant that only any combination of a tackifier layer, an adhesive layer, a protective coating layer, an alignment layer, and an application-type retardation layer is present on the opposite side of the polarizer to the polarizer protective film. When such configuration is adopted, the circularly polarizing plate can be thinned.

Specific preferred lamination examples between the polarizer and the quarter-wave layer include:
polarizer/adhesive layer/quarter-wave layer;
polarizer/protective coating layer/adhesive layer/quarter-wave layer;
polarizer/half-wave layer/adhesive layer/quarter-wave layer;
polarizer/adhesive layer/half-wave layer/adhesive layer/quarter-wave layer;
polarizer/protective coating layer/half-wave layer/adhesive layer/quarter-wave layer; and
polarizer/protective coating layer/adhesive layer/half-wave layer/adhesive layer/quarter-wave layer.

The adhesive layers in the above-mentioned examples may each be replaced by a tackifier layer. In addition, an alignment layer may be included on any side of the quarter-wave layer and the half-wave layer.

An adhesive such as a rubber-based, acrylic, urethane-based, olefin-based, or silicone-based adhesive is used for the adhesive layer without any limitation. Of those, an acrylic adhesive is preferred. The adhesive may be applied to an object, for example, the polarizer surface of the polarizing plate. A preferred method involves peeling off a release film on one surface of a substrate-free optical transparent adhesive (release film/adhesive layer/release film), and then bonding the remainder to the polarizer surface, to thereby arrange the adhesive layer. As a tackifier, a UV-curable, urethane-based, and epoxy-based tackifiers are each preferably used.

The tackifier layer or the adhesive layer is used for the bonding of the polarizer, the protective coating layer, the application-type retardation layer, or an image display cell.

An example in which the retardation layer (quarter-wave layer or half-wave layer) is arranged on the laminate of the polarizer protective film and the polarizer and then bonded to an object has been given above. However, the retardation layer (quarter-wave layer or half-wave layer) may be arranged on the object in advance, and the laminate of the polarizer protective film and the polarizer may be bonded thereto. The same applies when the C-plate layer is arranged.

When the retardation layer is a layer formed of a liquid crystal compound, a protective coating layer may be arranged on the opposite surface of the retardation layer to the polarizer. In addition, a film (self-supporting film) for protection may be arranged, but for the purpose of thinning, it is preferred to avoid the use of the film for protection.

The thickness of the thus obtained circularly polarizing plate is preferably 130 µm or less, more preferably 100 µm or less, still more preferably 90 µm or less, particularly preferably 85 µm or less.

The circularly polarizing plate is preferably bonded to a touchscreen, an organic EL cell, or the like via a tackifier or an adhesive.

B. Display Cell

A foldable display of the present invention includes the above-mentioned polarizing plate on a viewing side with respect to a display cell. A cell for a foldable display, such as a liquid crystal cell, an organic electroluminescence (EL) cell, or an inorganic EL cell, may be used as an image display cell without any particular limitation. Of those, an organic EL cell is preferred from the viewpoints of being thin and being excellent in flexibility. The image display cell and the polarizing plate are preferably bonded to each other via an adhesive.

The foldable display may be preferably used for any of the following: an image display apparatus capable of being folded into, for example, a V-shape, a Z-shape, a W-shape, or a casement window shape when carried (foldable image display apparatus), or a display capable of being rolled into a roll shape (rollable display).

When the foldable display has a display portion on the inner surface side of folding, the bend radius of the circularly polarizing plate in a folded state is reduced. In the case of such image display apparatus, the occurrence of a fold mark due to repeated folding operations can be effectively reduced by arranging the main alignment direction of the substrate film in a direction perpendicular to a folding direction (direction of folding motion). In the perpendicular direction, an angle between the main alignment direction of the polarizer protective film and the folding direction is preferably from 75° to 105°, more preferably from 80° to 100°, still more preferably from 83° to 97°.

The foldable display of the present invention can be a foldable display having a bend radius of 5 mm or less, further, 4 mm or less, in particular, 3 mm or less.

C. Other Members

The foldable display of the present invention may include any other constituent component in addition to the image display cell and the polarizing plate (circularly polarizing plate). Examples of the other constituent component include a touchscreen, a front-surface protective film, and a back-surface protective film. Further, in the case of a liquid crystal display apparatus, the foldable display preferably includes a backlight. Each of those constituent components is preferably bonded using a tackifier or an adhesive.

In addition, it is also a preferred mode that the polyester film to be used as the polarizer protective film of the present invention is used as a substrate film of each of those members. In particular, it is a preferred mode that the polarizing plate of the present invention is used as the polarizing plate in the foldable display, and at the same time, the polyester film to be used as the polarizer protective film of the present invention is used for at least one or both of the front-surface protective film and the back-surface protective film. In this case, the surface protective films may be any one or both of a surface protective film called a "window" surface protective film, which is built into the foldable display, and a surface protective film called an "aftermarket" surface protective film, film, which a user can replace.

Also when the polyester film is used as the substrate film of any of the above-mentioned members, the longitudinal direction of the polyester film is preferably set to the bending direction.

In the case of a member arranged between the image display cell and the polarizing plate, such as the touchscreen, it is preferred to use, as the substrate film, a film having small birefringence so as not to change a circular polarization characteristic. Specifically, a polyimide film, a polyamide film, a polyamide imide film, a polycarbonate film, an acrylic film, a triacetylcellulose film, a cycloolefin polymer film, a polyphenylene sulfide film, a polymethylpentene film, or the like having an in-plane retardation of 100 nm or less, further, 50 nm or less, in particular, 30 nm or less is preferably used.

EXAMPLES

Next, the present invention is described by way of Examples and Comparative Examples. First, methods of evaluating characteristic values performed in the present invention are shown below.

(1) Limiting Viscosity

A film or a polyester resin was pulverized and dried, and then dissolved in a mixed solvent of phenol/tetrachloroethane=60/40 (mass ratio). After this solution was centrifuged to remove inorganic particles, the flow time of the solution having a concentration of 0.4 (g/dl) at 30° C. and the flow time of the solvent alone were measured with an Ubbelohde viscometer. From a time ratio therebetween, the limiting viscosity was calculated using the Huggins equation on the assumption that the constant of the Huggins equation was 0.38.

(2) Bending Resistance of Polyester Film Sample (Bend Radius: 1.5 mm)

A polyester film sample having a size of 20 mm in its width direction and 110 mm in its machine direction was prepared. The sample was bent 200,000 times at a rate of once per second using a tension-free U-shape folding test jig (DLDMLH-FS manufactured by Yuasa System Co., Ltd.) with the bend radius being set to 1.5 mm. In this case, the sample was fixed at positions 10 mm away from both end portions on its long side, and hence the part to be bent had a size of 20 mm×90 mm. Here, FIG. 1 is a schematic view for illustrating a bend radius at a time when a foldable display is folded, and in consideration of a case in which a polyester film is arranged on the inside surface of the folded mode, the bending test is performed as a model assuming that the portion denoted by reference numeral 11 in FIG. 1 is set to 1.5 mm. After the completion of the bending treatment, the sample was placed on a flat surface with its bending inside facing down, and was visually observed.

○: No crack and deformation can be recognized on the sample.

×: The sample has a crack or a fold mark, and has a maximum floating height of 5 mm or more when horizontally placed.

(3) Bending Resistance of Polyester Film Sample (Bend Radius: 0.5 mm)

A polyester film sample was bent 200,000 times at a rate of once per second by the same method as in the above-mentioned bending test with the bend radius being set to 0.5 mm. Here, FIG. 1 is a schematic view for illustrating a bend radius at a time when a foldable display is folded, and in consideration of a case in which a polyester film is arranged on the inside surface of the folded mode, the bending test is performed as a model assuming that the portion denoted by reference numeral 11 in FIG. 1 is set to 0.5 mm. The film surface on the outside of the bent portion was observed with a digital microscope (RH8800 manufactured by Hirox Co., Ltd.) at a magnification of 700, and the presence or absence of a wrinkle (crack) was observed. Separate from the above-mentioned bending resistance visual observation test at a bend radius of 1.5 mm, this test, in which the bend radius was reduced to 0.5 mm, was performed with the intention of performing evaluation under a state closer to the state of actual use of a foldable display having a hard coating layer and other members laminated or bonded thereto. Separate from the above-mentioned visual observation at a bend radius of 1.5 mm, this test is intended to detect a defect of being liable to be fractured or being liable to be cracked, which is a minute defect difficult to detect by visual observation.

o: No defect is found on the film surface on the outside of the bending.

x: Fracture occurred, or a wrinkle (crack) can be recognized on the film surface on the outside of the bending.

(4) Bending Resistance of Circularly Polarizing Plate (Bend Radius: 3 mm)

A circularly polarizing plate sample having a size of 50 mm×100 mm was prepared, and bent 100,000 times at a rate of once per second using a tension-free U-shape folding test jig (DLDMLH-FS manufactured by Yuasa System Co., Ltd.) with the bend radius being set to 3 mm. In this case, the sample was fixed at positions 10 mm away from both end portions on its long side, and hence the part to be bent had a size of 50 mm×80 mm. The inside of the bending was set to be a substrate film side, and the slow axis of the substrate film and a folding direction were made orthogonal to each other. After the completion of the bending treatment, the sample was placed on a flat surface with its bending inside facing down, and was visually inspected. Further, the sample was observed with a digital microscope. Evaluation criteria are as described below.

o: The sample was not found to be deformed or fractured, and also had no wrinkle (crack).

x: The sample was found to be deformed, or had a wrinkle (crack).

(5) Refractive Index

A refractive index in a longitudinal direction, a refractive index in a width direction, and a refractive index in a thickness direction were determined using an Abbe refractometer (NAR-4T manufactured by Atago Co., Ltd., measurement wavelength: 589 nm) in conformity with JIS K 7142:2008 "Determination of the refractive index of plastics (Method A)."

(6) Total Light Transmittance and Haze

Measurement was performed using a haze meter (NDH 5000 manufactured by Nippon Denshoku Industries Co., Ltd.)

(7) Density

A density was measured in accordance with a method in conformity with JIS K 7112:1999 (density gradient tube method). (Unit: $g/cm^3$).

(8) Maximum Heat Shrinkage Ratio

A sample film was cut to measure 10 mm long by 250 mm wide. The long sides were aligned to a direction in which measurement was to be performed, the sample film was marked at an interval of 200 mm, and an interval A between the marks was measured under a constant tension of 5 g. Subsequently, the sample film was left to stand under no load in an oven having an atmosphere of 150° C. for 30 minutes, and was then removed from the oven and cooled to room temperature. After that, an interval B between the marks was determined under a constant tension of 5 g, and a heat shrinkage ratio (%) was determined by the following equation. For the heat shrinkage ratio, measurement is performed at positions equally dividing the sample film in its width direction into three parts, and the average value of three points is adopted as the heat shrinkage ratio (%).

Heat shrinkage ratio (%)=[(A−B)×100]/A

The sample film is separately cut so as to be different in length and width for each of both its bending direction and folding direction and subjected to measurement, and data in the direction in which the measured value is larger is adopted as a maximum heat shrinkage ratio (%).

<Production of Components of Easy-to-Adhere Layer>
(Polymerization of Polyester Resin)

A stainless-steel autoclave with a stirrer, a temperature gauge, and a partial reflux condenser was loaded with 194.2 parts by mass of dimethyl terephthalate, 184.5 parts by mass of dimethyl isophthalate, 14.8 parts by mass of dimethyl-5-sodium sulfoisophthalate, 233.5 parts by mass of diethylene glycol, 136.6 parts by mass of ethylene glycol, and 0.2 part by mass of tetra-n-butyl titanate, and the mixture was subjected to a transesterification reaction at a temperature of from 160° C. to 220° C. over 4 hours. Then, the temperature of the mixture was increased to 255° C., and the pressure of the reaction system was gradually reduced, followed by a reaction under a reduced pressure of 30 Pa for 1 hour and 30 minutes to provide a copolymerized polyester resin. The resultant copolymerized polyester resin was pale yellow and transparent. The reduced viscosity of the copolymerized polyester resin was measured to be 0.70 dl/g. The reduced viscosity is a value measured at 30° C. using, as a solvent, 25 mL of a mixed solvent of phenol (60 mass %) and 1,1,2,2-tetrachloroethane (40 mass %) with respect to 0.1 g of the resin. A glass transition temperature according to DSC was 40° C.

(Preparation of Water Dispersion of Polyester)

A reactor with a stirrer, a temperature gauge, and a reflux device was loaded with 30 parts by mass of the polyester resin and 15 parts by mass of ethylene glycol n-butyl ether, and the mixture was stirred while being heated at 110° C. to dissolve the resin. After the resin had been completely dissolved, while the polyester solution was stirred, 55 parts by mass of water was gradually added. After the completion of the addition, the mixed liquid was cooled to room temperature while being stirred to provide a milky-white water dispersion of polyester having a solid content of 30 mass %.

(Preparation of Aqueous Solution of Polyvinyl Alcohol)

A vessel with a stirrer and a temperature gauge was loaded with 90 parts by mass of water, and 10 parts by mass of a polyvinyl alcohol resin (manufactured by Kuraray Co., Ltd., having a degree of polymerization of 500 and a degree of saponification of 74%) was gradually added to the stirred water. After the completion of the addition, the mixed liquid was heated to 95° C. while being stirred to dissolve the resin. After the resin had been dissolved, the mixed liquid was cooled to room temperature while being stirred to provide an aqueous solution of polyvinyl alcohol having a solid content of 10 mass %.

(Polymerization of Blocked Polyisocyanate Crosslinking Agent to be Used in Easy-to-Adhere Layer P1)

A flask with a stirrer, a temperature gauge, and a reflux condenser tube was loaded with 100 parts by mass of a polyisocyanate compound having an isocyanurate structure using hexamethylene diisocyanate as a raw material (manufactured by Asahi Kasei Chemicals Corporation, Duranate TPA), 55 parts by mass of propylene glycol monomethyl ether acetate, and 30 parts by mass of polyethylene glycol monomethyl ether (average molecular weight: 750), and the mixture was kept under a nitrogen atmosphere at 70° C. for 4 hours. After that, the temperature of the reaction liquid was decreased to 50° C., and 47 parts by mass of methyl ethyl ketoxime was added dropwise. The infrared spectrum of the reaction liquid was measured, and it was recognized that the absorption of an isocyanate group had disappeared. Thus, a water dispersion liquid of blocked polyisocyanate having a solid content of 75 mass % was obtained.

(Preparation of Application Liquid for Easy-to-Adhere Layer P1)

The following raw materials were mixed to prepare an application liquid.

| | |
|---|---|
| Water | 40.61 mass % |
| Isopropanol | 30.00 mass % |
| Water dispersion of polyester | 11.67 mass % |
| Aqueous solution of polyvinyl alcohol | 15.00 mass % |
| Blocked isocyanate-based crosslinking agent | 0.67 mass % |
| Particles (silica sol having an average particle diameter of 100 nm, solid content concentration: 40 mass %) | 1.25 mass % |
| Catalyst (organotin-based compound, solid content concentration: 14 mass %) | 0.3 mass % |
| Surfactant (silicon-based, solid content concentration: 10 mass %) | 0.5 mass % |

(Polymerization of Urethane Resin to be Used in Easy-to-Adhere Layer P2)

A urethane resin using an aliphatic polycarbonate polyol as a constituent component was produced by the following procedure. A four-necked flask with a stirrer, a Dimroth condenser, a nitrogen inlet tube, a silica gel drying tube, and a temperature gauge was loaded with 43.75 parts by mass of 4,4-diphenylmethane diisocyanate, 12.85 parts by mass of dimethylol butanoic acid, 153.41 parts by mass of polyhexamethylene carbonate diol having a number-average molecular weight of 2,000, 0.03 part by mass of dibutyltin dilaurate, and 84.00 parts by mass of acetone serving as a solvent. Under a nitrogen atmosphere, the mixture was stirred at 75° C. for 3 hours, and it was recognized that the reaction liquid had reached a predetermined amine equivalent. Next, the temperature of the reaction liquid was decreased to 40° C., and then 8.77 parts by mass of triethylamine was added to provide a polyurethane prepolymer solution. Next, 450 g of water was added to a reaction vessel with a homodisper capable of high-speed stirring. The temperature was adjusted to 25° C., and while the water was stirred and mixed at 2,000 min$^{-1}$, the polyurethane prepolymer solution was added and dispersed. After that, some of the acetone and the water were removed from the mixed liquid under reduced pressure to prepare a water-soluble polyurethane resin having a solid content of 35%. The resultant polyurethane resin using an aliphatic polycarbonate polyol as a constituent component had a glass transition temperature of −30° C.

(Polymerization of Oxazoline-Based Crosslinking Agent to be Used in Easy-to-Adhere Layer P2)

A flask with a temperature gauge, a nitrogen gas inlet tube, a reflux condenser, a dropping funnel, and a stirrer was loaded with a mixture of 58 parts by mass of ion-exchanged water and 58 parts by mass of isopropanol serving as an aqueous medium, and 4 parts by mass of a polymerization initiator (2,2'-azobis(2-amidinopropane) dihydrochloride). Meanwhile, the dropping funnel was loaded with a mixture of 16 parts by mass of 2-isopropenyl-2-oxazoline serving as a polymerizable unsaturated monomer having an oxazoline group, 32 parts by mass of methoxypolyethylene glycol acrylate (average number of moles of ethylene glycol added: 9 mol, manufactured by Shin-Nakamura Chemical Co., Ltd.), and 32 parts by mass of methyl methacrylate, and the mixture was dropped under a nitrogen atmosphere at 70° C. over 1 hour. After the completion of the dropping, the reaction solution was stirred for 9 hours and cooled to provide a water-soluble resin having a solid content concentration of 40 mass % and having an oxazoline group.

(2) Preparation of Application Liquid for Easy-to-Adhere Layer P2

The following raw materials were mixed to prepare an application liquid for forming an applied layer excellent in adhesive property with a functional layer.

| | |
|---|---|
| Water | 55.62 mass % |
| Isopropanol | 30.00 mass % |
| Polyurethane resin | 11.29 mass % |
| Aqueous solution of oxazoline-based crosslinking agent | 2.26 mass % |
| Particles (silica sol having an average particle diameter of 40 nm, solid content concentration: 40 mass %) | 0.71 mass % |
| Particles (silica sol having an average particle diameter of 450 nm, solid content concentration: 40 mass %) | 0.07 mass % |
| Surfactant (silicon-based, solid content concentration: 100 mass %) | 0.05 mass % |

(Preparation of Polyethylene Terephthalate Pellets)

A continuous esterification reactor including a three-stage complete mixing vessel including a stirrer, a condenser, a raw material feeder, and a product extracting port was used as an esterification reactor. A slurry of TPA (2 tons/hr), EG (2 mol per mol of TPA), and antimony trioxide (160 ppm of Sb atoms based on produced PET) was continuously supplied to the first esterification reaction unit of the esterification reactor, and was subjected to a reaction at 255° C. for an average residence time of 4 hours under normal pressure. Subsequently, the reaction product in the first esterification reaction unit was taken out of the system, and supplied to the second esterification reaction unit. EG evaporated from the first esterification reaction unit (8 mass % of the produced polymer (produced PET)) was supplied to the second esterification reaction unit. Further, an EG solution containing magnesium acetate such that the amount of Mg atoms was 65 ppm based on the produced PET and an EG solution containing TMPA such that the amount of P atoms was 20 ppm based on the produced PET were added thereto, and the mixture was subjected to a reaction at 260° C. for an average residence time of 1.5 hours under normal pressure. Subsequently, the reaction product in the second esterification reaction unit was continuously taken out of the system and supplied to the third esterification reaction unit. An EG solution containing TMPA such that the amount of P atoms was 20 ppm based on the produced PET was further added thereto, followed by a reaction at 260° C. for an average residence time of 0.5 hour under normal pressure. The esterification reaction product generated in the third esterification reaction unit was continuously supplied to a three-stage continuous polycondensation reactor to perform polycondensation, followed by filtration through a filtering medium of a stainless-steel sintered body (nominal filtration accuracy: 5-μm particle 90% cut). Thus, polyethylene terephthalate pellets having a limiting viscosity of 0.62 dl/g were obtained.

(PET Film 1)

The polyethylene terephthalate pellets were fed to an extruder and melted at 285° C. The polymer was filtered through a filtering medium of a stainless-steel sintered body (nominal filtration accuracy: 10 μm-particle 95% cut) and extruded into a sheet shape from a mouthpiece, and then cooled and solidified through contact with a casting drum having a surface temperature of 30° C. using a static electricity applying casting method, to thereby produce an unstretched film. The unstretched film was uniformly heated to 75° C. using a heating roll, heated to 85° C. with a non-contact heater, and subjected to roll stretching (longitudinal stretching) at a ratio of 1.4 times. The above-mentioned application liquids for forming easy-to-adhere layers P1 and P2 were applied to one surface and the opposite surface of the resultant uniaxially stretched film, respectively, by a roll coating method, and were then dried at 80° C. for 20 seconds. An application amount after final (after biaxial stretching) drying was adjusted to 0.06 g/m². After that, the film was introduced into a tenter and preheated at 105° C., and then laterally stretched at 95° C. at a ratio of 4.0 times. The film was subjected to heat fixation at 230° C. for 5 seconds with its width fixed, and was relaxed by 4% in its width direction at 180° C. to provide a polyethylene terephthalate film (PET film 1) having a thickness of 50 μm. Evaluation results are shown in Table 1.

(PET Films 2 and 3)

PET films 2 and 3 were obtained in the same manner as the PET film 1 except that the stretching ratio in the longitudinal direction was changed as shown in Table 1.

(PET Film 4)

A PET film 4 was obtained in the same manner as the PET film 1 except that the stretching ratio in the width direction was changed to 4.4 times, and the heat fixation temperature was changed to 220° C.

(PET Film 5 and 6)

PET films 5 and 6 were obtained in the same manner as the PET film 4 except that the stretching ratio in the longitudinal direction was changed as shown in Table 1.

(PET Film 7)

A PET film 7 was obtained in the same manner as the PET film 1 except that the stretching ratio in the width direction was changed to 5.5 times, and the heat fixation temperature was changed to 190° C.

(PET Films 8 and 9)

PET films 8 and 9 were obtained in the same manner as the PET film 7 except that the stretching ratio in the longitudinal direction was changed as shown in Table 1.

(PET Film 10)

A PET film 10 was obtained in the same manner as the PET film 5 except that, in the production process of the PET film 5, 10% relaxation heat treatment was performed at 100° C. after the stretching in the longitudinal direction.

(PET Film 11)

A PET film 11 was obtained in the same manner as the PET film 5 except that, in the production process of the PET film 5, clips were released at 200° C. after the heat fixation, and relaxation heat treatment was performed in the longitudinal direction and the width direction. A tenter speed and a take-up roll speed were adjusted so as to achieve a relaxation ratio of 3% in the longitudinal direction. The relaxation in the width direction was performed so as to achieve a free state.

(PET Film 12)

A PET film 12 was obtained in the same manner as the PET film 1 except that the temperature at the time of the stretching in the longitudinal direction was changed to 75° C., and the heat fixation temperature was changed to 220° C.

(PET Film 13)

A PET film 13 was obtained in the same manner as the PET film 1 except that the stretching in the longitudinal direction was performed with the temperature at the time of the stretching being changed to 75° C. and the stretching ratio being changed to 1.2 times, and then the stretching in the width direction was performed with the stretching ratio being changed to 5.0 times.

(PET Film 14)

A PET film 14 was obtained in the same manner as the PET film 3 except that the stretching in the longitudinal direction of the PET film 3 was changed to two-stage stretching in which a stretching ratio in the first stage was set to 1.2 times and a stretching ratio in the second stage was set to 1.67 times. The total stretching ratio in the longitudinal direction is about 2.0 times.

(PET Film 15)

A PET film 15 was obtained in the same manner as the PET film 5 except that the preheating temperature at the time of the stretching in the width direction was changed to 95° C., and the heat fixation temperature was changed to 190° C.

(PET Film 16)

A PET film 16 was obtained in the same manner as the PET film 2 except that the stretching in the width direction of the PET film 2 was changed to two-stage stretching in which a stretching ratio in the first stage was set to 1.5 times and a stretching ratio in the second stage was set to 4.0 times, and the heat fixation temperature was changed to 190° C. The total stretching ratio in the width direction is 6.0 times.

(PET Films 17 and 18)

PET films 17 and 18 were obtained in the same manner as the PET film 2 except that the thickness was changed as shown in Table 1.

(PET Film 19)

A PET film 19 was obtained in the same manner as the PET film 1 except that, in the production process of the PET film 1, the relaxation heat treatment in the width direction was not performed.

(PET Film 20)

An unstretched film was produced in the same manner as the PET film 1. After that, in a tenter, the unstretched film was preheated at 75° C. and laterally stretched at 85° C. at a ratio of 1.4 times. The above-mentioned application liquids for forming easy-to-adhere layers were applied to both surfaces of the resultant uniaxially stretched film by a roll coating method, and were then dried at 80° C. for 20 seconds. An application amount after final (after biaxial stretching) drying was adjusted to 0.06 g/m². The film was uniformly heated to 105° C. using a heating roll, heated to 95° C. with a non-contact heater, and subjected to roll stretching (longitudinal stretching) at a ratio of 4.0 times. The film was subjected to heat fixation at 230° C. for 5 seconds with its width fixed to provide a PET film 20 having a thickness of 50 μm.

(PET Film 21)

A PET film 21 was obtained in the same manner as the PET film 7 except that lateral uniaxial stretching was performed by performing stretching only in the width direction without performing the stretching in the longitudinal direction.

(PET Film 22)

A PET film 22 was obtained in the same manner as the PET film 1 except that the heat fixation temperature was changed to 220° C., and the thickness was changed to 75 μm.

(PET Film 23)

A PET film 23 was obtained in the same manner as the PET film 4 except that the heat fixation temperature was changed to 100° C.

The characteristics of each film are shown in Table 1.

TABLE 1

| | | \multicolumn{19}{c|}{PET film} |
|---|---|---|---|---|---|---|---|---|---|---|---|---|---|---|---|---|---|---|---|
| | Limiting viscosity (dl/g) | Stretching ratio Longitudinal direction | Stretching ratio Width direction | Stretching temperature in longitudinal direction (°C) | Preheating temperature in width direction (°C) | Heat fixation temperature (°C) | Relaxation direction | Relaxation ratio (%) | Thickness (µm) | Density (g/cm³) | Refractive index Longitudinal direction | Refractive index Width direction | Refractive index Thickness direction | Bending direction | Continuous bending test at bend radius of 1.5 mm | Continuous bending test at bend radius of 0.5 mm | Total light transmittance (%) | Haze (%) | Maximum heat shrinkage ratio (%) |
|---|---|---|---|---|---|---|---|---|---|---|---|---|---|---|---|---|---|---|---|
| PET film 1 | 0.58 | 1.4 | 4.0 | 85 | 105 | 230 | Width direction | 4 | 50 | 1.385 | 1.596 | 1.684 | 1.516 | Longitudinal direction | ○ | ○ | 91 | 0.8 | 1.4 |
| PET film 2 | 0.58 | 1.7 | 4.0 | 85 | 105 | 230 | Width direction | 4 | 50 | 1.385 | 1.602 | 1.681 | 1.512 | Longitudinal direction | ○ | ○ | 91 | 0.8 | 1.5 |
| PET film 3 | 0.58 | 2.0 | 4.0 | 85 | 105 | 230 | Width direction | 4 | 50 | 1.387 | 1.609 | 1.679 | 1.509 | Longitudinal direction | ○ | ○ | 91 | 0.8 | 1.6 |
| PET film 4 | 0.58 | 1.4 | 4.4 | 85 | 105 | 220 | Width direction | 4 | 50 | 1.383 | 1.592 | 1.69 | 1.517 | Longitudinal direction | ○ | ○ | 91 | 0.8 | 1.7 |
| PET film 5 | 0.58 | 1.7 | 4.4 | 85 | 105 | 220 | Width direction | 4 | 50 | 1.383 | 1.597 | 1.688 | 1.515 | Longitudinal direction | ○ | ○ | 91 | 0.8 | 1.9 |
| PET film 6 | 0.58 | 2.0 | 4.4 | 85 | 105 | 220 | Width direction | 4 | 50 | 1.384 | 1.598 | 1.686 | 1.513 | Longitudinal direction | ○ | ○ | 91 | 0.8 | 2.2 |
| PET film 7 | 0.58 | 1.4 | 5.5 | 85 | 105 | 190 | Width direction | 4 | 50 | 1.383 | 1.591 | 1.694 | 1.513 | Longitudinal direction | ○ | ○ | 91 | 0.8 | 4.4 |
| PET film 8 | 0.58 | 1.7 | 5.5 | 85 | 105 | 190 | Width direction | 4 | 50 | 1.383 | 1.596 | 1.690 | 1.512 | Longitudinal direction | ○ | ○ | 91 | 0.8 | 4.9 |
| PET film 9 | 0.58 | 2.0 | 5.5 | 85 | 105 | 190 | Width direction | 4 | 50 | 1.383 | 1.597 | 1.688 | 1.513 | Longitudinal direction | ○ | ○ | 91 | 0.8 | 5.1 |
| PET film 10 | 0.58 | 1.7 | 4.4 | 85 | 105 | 220 | Longitudinal direction | 10 | 50 | 1.385 | 1.594 | 1.689 | 1.515 | Longitudinal direction | ○ | ○ | 91 | 0.8 | 1.0 |
| PET film 11 | 0.58 | 1.7 | 4.4 | 85 | 105 | 220 | Longitudinal/width direction | 3/— | 50 | 1.385 | 1.596 | 1.687 | 1.515 | Longitudinal direction | ○ | ○ | 91 | 0.8 | 0.8 |
| PET film 12 | 0.58 | 1.4 | 4.0 | 75 | 105 | 220 | Width direction | 4 | 50 | 1.385 | 1.606 | 1.684 | 1.518 | Longitudinal direction | ○ | ○ | 91 | 0.8 | 1.5 |
| PET film 13 | 0.58 | 1.2 | 5.0 | 75 | 105 | 220 | Width direction | 4 | 50 | 1.386 | 1.591 | 1.685 | 1.519 | Longitudinal direction | ○ | ○ | 91 | 0.8 | 1.5 |
| PET film 14 | 0.58 | 2.0 (two stages) | 4.0 | 85 | 105 | 230 | Width direction | 4 | 50 | 1.388 | 1.606 | 1.681 | 1.511 | Longitudinal direction | ○ | ○ | 91 | 0.8 | 1.6 |
| PET film 15 | 0.58 | 1.7 | 4.4 | 85 | 95 | 190 | Width direction | 4 | 50 | 1.383 | 1.598 | 1.691 | 1.495 | Longitudinal direction | ○ | ○ | 91 | 0.8 | 5.0 |
| PET film 16 | 0.58 | 1.7 | 6.0 (two stages) | 85 | 105 | 190 | Width direction | 4 | 50 | 1.384 | 1.594 | 1.695 | 1.508 | Longitudinal direction | ○ | ○ | 91 | 0.8 | 4.7 |
| PET film 17 | 0.58 | 1.7 | 4.0 | 85 | 105 | 230 | Width direction | 4 | 25 | 1.387 | 1.602 | 1.681 | 1.512 | Longitudinal direction | ○ | ○ | 91 | 0.8 | 1.4 |

TABLE 1-continued

| | | Stretching ratio | | Stretching temperature in longitudinal direction (° C.) | Pre-heating temperature in width direction (° C.) | Heat fixation temperature (° C.) | Relaxation direction | Relaxation ratio (%) | Thickness (μm) | Density (g/cm³) | Refractive index | | | Bending direction | Continuous bending test at bend radius of 1.5 mm | Continuous bending test at bend radius of 0.5 mm | Total light transmittance (%) | Haze (%) | Maximum heat shrinkage ratio (%) |
|---|---|---|---|---|---|---|---|---|---|---|---|---|---|---|---|---|---|---|---|
| | Limiting viscosity (dl/g) | Longitudinal direction | Width direction | | | | | | | | Longitudinal direction | Width direction | Thickness direction | | | | | | |
| PET film 18 | 0.58 | 1.7 | 4.0 | 85 | 105 | 230 | Width direction | 4 | 75 | 1.386 | 1.602 | 1.681 | 1.512 | Longitudinal direction | ○ | ○ | 91 | 0.8 | 1.5 |
| PET film 19 | 0.58 | 1.4 | 4.0 | 85 | 105 | 230 | — | 0 | 50 | 1.384 | 1.598 | 1.687 | 1.513 | Longitudinal direction | ○ | ○ | 91 | 0.8 | 2.0 |
| PET film 20 | 0.58 | 4.0 | 1.4 | 105 | 85 | 230 | — | 0 | 50 | 1.385 | 1.686 | 1.593 | 1.516 | Width direction | ○ | ○ | 91 | 0.8 | 1.5 |
| PET film 21 | 0.58 | 1.0 | 5.5 | — | 105 | 190 | Width direction | 4 | 50 | 1.383 | 1.584 | 1.701 | 1.512 | Longitudinal direction | ○ | x | 91 | 0.8 | 3.7 |
| PET film 22 | 0.58 | 1.4 | 4.0 | 85 | 105 | 220 | Width direction | 4 | 75 | 1.381 | 1.623 | 1.690 | 1.526 | Longitudinal direction | x | ○ | 91 | 0.8 | 1.8 |
| PET film 23 | 0.58 | 1.4 | 4.4 | 85 | 105 | 100 | Width direction | 4 | 50 | 1.364 | 1.578 | 1.660 | 1.532 | Longitudinal direction | x | ○ | 91 | 0.8 | 6.3 |

(Lamination of Polarizer)

The following two kinds of methods were each performed as a method of arranging a polarizer on a polyester film (polarizer protective film).

(A) a method involving arranging a rubbed alignment layer on the polyester film, and arranging a polarizing film formed of a liquid crystal compound and a dichroic dye thereon (polarizer lamination method A)

(B) a method involving arranging a polarizing film formed of PVA/iodine on a thermoplastic substrate, and then transferring the film onto the polyester film (polarizer lamination method B)

Details of each of the methods are described below.

Polarizer Lamination Method A (Formation of Rubbed Alignment Layer)

A coating material for a rubbed alignment layer having the following composition was applied to the easy-to-adhere layer P1 surface of the polyester film using a bar coater, and was dried at 120° C. for 3 minutes to form a film having a thickness of 200 nm. Subsequently, the surface of the resultant film was treated with a rubbing roll wrapped in raised cloth made of nylon to provide a polyester film having laminated thereon a rubbed alignment layer. The rubbing was performed in a direction parallel or orthogonal to the slow axis of the polyester film.

Coating Material for Rubbed Alignment Layer

| | |
|---|---|
| Completely saponified polyvinyl alcohol (molecular weight: 800) | 2 parts by mass |
| Ion-exchanged water | 100 parts by mass |

(Synthesis of Polymerizable Liquid Crystal Compound)

The following compound (i) and the following compound (ii) were synthesized with reference to the description in paragraph [0134] of JP 2007-510946 A, and Lub et al. Recl. Trav. Chim. Pays-Bas, 115, 321-328 (1996).

The following dye (iii) was synthesized with reference to Example 1 of JP 63-301850 A.

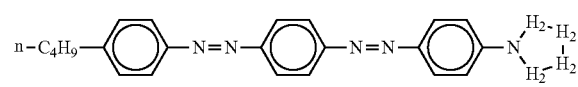

A dye (iv) was synthesized with reference to Example 2 of JP 05-49710 B2.

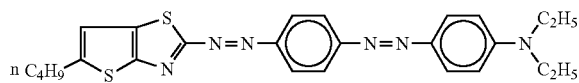

The following dye (v) was synthesized with reference to a method of producing a compound of the general formula (1) of JP 63-1357 B2.

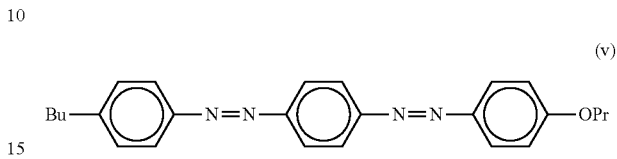

(Formation of Polarizing Film)

A coating material for a polarizing film, which was formed of 75 parts by mass of the compound (i), 25 parts by mass of the compound (ii), 2.5 parts by mass of the dye (iii), 2.5 parts by mass of the dye (iv), 2.5 parts by mass of the dye (v), 6 parts by mass of IRGACURE (trademark) 369E (manufactured by BASF), and 250 parts by mass of o-xylene, was applied onto the substrate film having laminated thereon a rubbed alignment layer using a bar coater, and was dried at 110° C. for 3 minutes to form a film having a thickness of 2 µm. Subsequently, the film was irradiated with UV light to form a polarizer on the substrate film.

Polarizer Lamination Method B (Production of Substrate-Laminated Polarizer)

An unstretched film having a thickness of 100 µm was produced as a thermoplastic resin substrate using the polyethylene terephthalate pellets, and an aqueous solution of polyvinyl alcohol having a degree of polymerization of 2,400 and a degree of saponification of 99.9 mol % was applied to one surface of the unstretched film and dried to form a PVA layer.

The resultant laminate was stretched in its longitudinal direction at a ratio of 2 times at 120° C. between rolls having

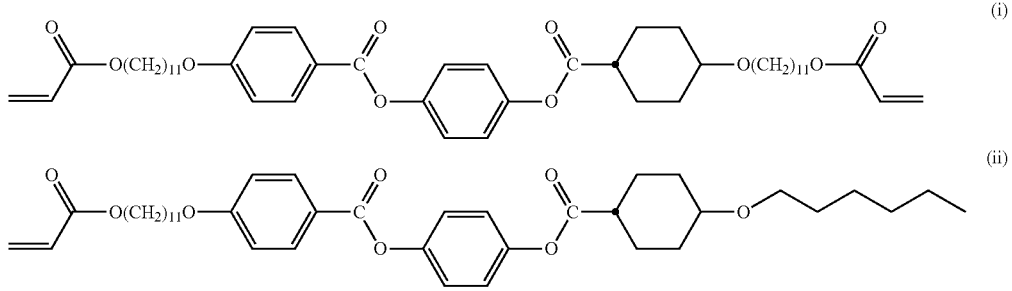

different peripheral speeds and taken up. Next, the resultant laminate was treated in a 4% aqueous solution of boric acid for 30 seconds, and then dyed by being immersed in a mixed aqueous solution of iodine (0.2%) and potassium iodide (1%) for 60 seconds, followed by treatment in a mixed aqueous solution of potassium iodide (3%) and boric acid (3%) for 30 seconds.

Further, the laminate was uniaxially stretched in its longitudinal direction in a mixed aqueous solution of boric acid (4%) and potassium iodide (5%) at 72° C. The laminate after the stretching was then washed with a 4% aqueous solution of potassium iodide, and the aqueous solution was removed with an air knife. After that, the laminate was dried in an oven at 80° C., slit at both end portions, and taken up to provide a substrate-laminated polarizer having a width of 30 cm and a length of 1,000 m. The total stretching ratio was 6.5 times, and the thickness of the polarizer was 5 µm. The thickness was read by embedding the substrate-laminated polarizer in an epoxy resin, cutting out a section, and observing the section with an optical microscope.

(Lamination of Polarizing Layer)

A UV-curable acrylic tackifier was applied to the polyester film, and then the polarizer surface of the substrate-laminated polarizer, which had been cut to a required length, was bonded, followed by irradiation with UV light from the substrate-laminated polarizer side, to thereby laminate the substrate-laminated polarizer on the polyester film. After that, the thermoplastic resin substrate was peeled off. Thus, the polarizer was arranged on the polyester film.

(Lamination of Retardation Layer)

The following two kinds of methods were each performed as a method of arranging a retardation layer on the polarizer.

(C) A method involving arranging a quarter-wave layer and a half-wave layer on a release film, and transferring the layers onto the polarizer (retardation layer lamination method C)

(D) A method involving arranging a half-wave layer on a quarter-wave layer by application, and bonding the half-wave layer surface of the resultant to the polarizer (retardation layer lamination method D)

Details of each of the methods are described below.

Retardation Layer Lamination Method C

A biaxially stretched polyethylene terephthalate (PET) film having a thickness of 50 µm was subjected to rubbing treatment, and a solution for retardation layer formation having the following composition was applied to the rubbing-treated surface by a bar coating method. The applied film was dried to perform alignment treatment, and was then cured by irradiation with UV light to produce a quarter-wave layer.

Solution for Retardation Layer Formation

| | |
|---|---|
| LC242 (manufactured by BASF SE) | 75 parts by mass |
| The following compound | 20 parts by mass |
| Trimethylolpropane triacrylate | 5 parts by mass |
| IRGACURE 379 | 3 parts by mass |
| Surfactant | 0.1 part by mass |
| Methyl ethyl ketone | 250 parts by mass |

Further, polyvinyl alcohol (2 mass % aqueous solution (surfactant: 0.2) of polyvinyl alcohol 1000, completely saponified) was applied onto the quarter-wave layer and dried to provide a polyvinyl alcohol film having a thickness of about 100 nm. Subsequently, the surface of the polyvinyl alcohol film was subjected to rubbing treatment. The solution for retardation layer formation was applied to the rubbing-treated surface of the PVA by a bar coating method, and dried to perform alignment treatment, and was then cured by irradiation with UV light to form a half-wave layer.

A retardation was adjusted on the basis of a film thickness, and an angle between the rubbing direction in the formation of the quarter-wave layer and the rubbing direction in the formation of the half-wave layer was adjusted to 60°. A light peeling liner of an optical transparent adhesive sheet was peeled off, and the adhesive surface and the half-wave layer surface were bonded to each other. After that, a heavy peeling liner of the optical transparent adhesive sheet was peeled off, and the remainder was bonded to the polarizer arranged on the polarizer protective film. After that, the biaxially stretched PET film was peeled off. The bonding was performed so that the absorption axis of the polarizer formed an angle of 15° with the rubbing direction of the half-wave layer, and formed an angle of 75° with the rubbing direction of the quarter-wave layer.

Retardation Layer Lamination Method D

A quarter-wave film was unrolled from a roll of a quarter-wave film having a slow axis in its length direction, and was cut to a required length, and the surface thereof was subjected to rubbing treatment. The solution for retardation layer formation was applied to the rubbing-treated surface by a bar coating method, and was dried to perform alignment treatment, followed by curing by irradiation with UV light to form a half-wave layer. Meanwhile, a light peeling liner of an optical transparent adhesive sheet was peeled off, and the adhesive surface and the half-wave layer were bonded to each other. After that, a heavy peeling liner of the optical transparent adhesive sheet was peeled off, and the remainder was bonded to the polarizer arranged on the polarizer protective film. The quarter-wave film used was a film (thickness: 20 µm) produced by extruding a propylene-ethylene random copolymer (ethylene content ratio: 5%) into a sheet shape, and stretching the sheet in its length direction with a roll. The bonding was performed so that the absorption axis of the polarizer formed an angle of 15° with the rubbing direction of the half-wave layer, and formed an angle of 75° with the slow axis direction of the quarter-wave layer.

The thicknesses of the retardation layers formed by application as described above were as follows: the thickness of the quarter-wave layer was 1.2 µm, and the thickness of the half-wave layer was 2.3 µm. The thickness of the tackifier layer was 3 µm.

Examples 1 to 26 and Comparative Examples 1 to 3

Circularly polarizing plates were each produced by arranging a polarizer and a retardation layer on a PET film shown in Table 2 by methods shown in Table 2, and were each evaluated for bending resistance.

TABLE 2

| | PET film No. | Polarizer lamination method | Retardation layer lamination method | Relationship between slow axis direction of polarizer protective film and absorption axis direction of polarizer | Bending resistance of circularly polarizing plate |
|---|---|---|---|---|---|
| Example 1 | 1 | A | C | Orthogonal | ○ |
| Example 2 | 1 | A | C | Parallel | ○ |
| Example 3 | 1 | A | D | Orthogonal | ○ |

TABLE 2-continued

| | PET film No. | Polarizer lamination method | Retardation layer lamination method | Relationship between slow axis direction of polarizer protective film and absorption axis direction of polarizer | Bending resistance of circularly polarizing plate |
|---|---|---|---|---|---|
| Example 4 | 1 | B | C | Orthogonal | ○ |
| Example 5 | 1 | B | C | Parallel | ○ |
| Example 6 | 1 | B | D | Orthogonal | ○ |
| Example 7 | 2 | B | C | Orthogonal | ○ |
| Example 8 | 3 | B | C | Orthogonal | ○ |
| Example 9 | 4 | B | C | Orthogonal | ○ |
| Example 10 | 5 | B | C | Orthogonal | ○ |
| Example 11 | 6 | B | C | Orthogonal | ○ |
| Example 12 | 7 | B | C | Orthogonal | ○ |
| Example 13 | 8 | A | C | Orthogonal | ○ |
| Example 14 | 8 | B | C | Orthogonal | ○ |
| Example 15 | 9 | B | C | Orthogonal | ○ |
| Example 16 | 10 | B | C | Orthogonal | ○ |
| Example 17 | 11 | B | C | Orthogonal | ○ |
| Example 18 | 12 | B | C | Orthogonal | ○ |
| Example 19 | 13 | B | C | Orthogonal | ○ |
| Example 20 | 14 | B | C | Orthogonal | ○ |
| Example 21 | 15 | B | C | Orthogonal | ○ |
| Example 22 | 16 | B | C | Orthogonal | ○ |
| Example 23 | 17 | B | C | Orthogonal | ○ |
| Example 24 | 18 | B | C | Orthogonal | ○ |
| Example 25 | 19 | B | C | Orthogonal | ○ |
| Example 26 | 20 | B | C | Orthogonal | ○ |
| Comparative Example 1 | 21 | B | C | Orthogonal | x |
| Comparative Example 2 | 22 | B | C | Orthogonal | x |
| Comparative Example 3 | 23 | B | C | Orthogonal | x |

INDUSTRIAL APPLICABILITY

Each of the polarizing plate and circularly polarizing plate for a foldable display of the present invention hardly has a fold mark even when repeatedly folded, is free of a risk of causing image distortion at the folding portion thereof, and hence can be suitably used for a foldable display. In addition, the foldable display of the present invention can display an image free of distortion at the folding portion thereof.

EXPLANATION OF REFERENCE NUMERALS

1: foldable display
11: bend radius
2: polyester film for polarizer protective film included in polarizing plate for foldable display
21: folding portion
22: bending direction (direction orthogonal to folding portion)

The invention claimed is:

1. A polarizing plate for a foldable display, comprising:
a polarizer; and
a polarizer protective film formed of a polyester film laminated on at least one surface of the polarizer,
wherein the polyester film is a biaxially stretched polyethylene terephthalate film and satisfies the following conditions:
(1) a refractive index in a bending direction is from 1.590 to 1.600;
(2) a refractive index in a folding portion direction is from 1.680 to 1.695;
(3) a refractive index in a thickness direction is 1.505 or less; and
(4) a density is 1.380 g/cm$^3$ or more,
wherein the bending direction refers to a direction orthogonal to a folding portion of the polyester film at a time when the polyester film is folded.

2. The polarizing plate for a foldable display according to claim 1, wherein the polarizer has a thickness of 12 μm or less.

3. The polarizing plate for a foldable display according to claim 2, wherein the polarizer is formed of a polymerizable liquid crystal compound and a dichroic dye.

4. The polarizing plate for a foldable display according to claim 1, wherein the polarizer is formed of a polymerizable liquid crystal compound and a dichroic dye.

5. A foldable display comprising the polarizing plate for a foldable display of claim 1.

6. A foldable display comprising the polarizing plate for a foldable display of claim 2.

7. A foldable display comprising the polarizing plate for a foldable display of claim 3.

8. A circularly polarizing plate for a foldable display, comprising: the polarizing plate for a foldable display of claim 1; and
a retardation layer formed on at least one surface of the polarizing plate.

9. The circularly polarizing plate for a foldable display according to claim 8, wherein the circularly polarizing plate is free of any self-supporting film or further comprises only one self-supporting film other than the polyester film.

10. The circularly polarizing plate for a foldable display according to claim 9, wherein the polarizer has a thickness of 12 μm or less.

11. The circularly polarizing plate for a foldable display according to claim 10, wherein the polarizer is formed of a polymerizable liquid crystal compound and a dichroic dye.

12. The circularly polarizing plate for a foldable display according to claim 9, wherein the polarizer is formed of a polymerizable liquid crystal compound and a dichroic dye.

13. The circularly polarizing plate for a foldable display according to claim 8, wherein the polarizer has a thickness of 12 μm or less.

14. The circularly polarizing plate for a foldable display according to claim 8, wherein the polarizer is formed of a polymerizable liquid crystal compound and a dichroic dye.

15. A foldable display comprising the circularly polarizing plate for a foldable display of claim 8, wherein the retardation layer contains a liquid crystal compound.

16. A foldable display comprising the circularly polarizing plate for a foldable display of claim 9, wherein the retardation layer contains a liquid crystal compound.

17. A foldable display comprising the circularly polarizing plate for a foldable display of claim 10, wherein the retardation layer contains a liquid crystal compound.

* * * * *